United States Patent
Xu et al.

(10) Patent No.: US 12,550,032 B2
(45) Date of Patent: Feb. 10, 2026

(54) COMMUNICATION METHOD AND DEVICE

(71) Applicant: Huawei Technologies Co., Ltd., Shenzhen (CN)

(72) Inventors: Bin Xu, Beijing (CN); Bingzhao Li, Beijing (CN); Lei Chen, Beijing (CN); Bo Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 332 days.

(21) Appl. No.: 17/848,797

(22) Filed: Jun. 24, 2022

(65) Prior Publication Data

US 2022/0322196 A1 Oct. 6, 2022

Related U.S. Application Data

(63) Continuation of application No. PCT/CN2019/128349, filed on Dec. 25, 2019.

(51) Int. Cl.
*H04W 36/30* (2009.01)
*H04L 41/0631* (2022.01)
*H04L 41/0659* (2022.01)
*H04W 36/06* (2009.01)
*H04W 76/18* (2018.01)

(52) U.S. Cl.
CPC ....... *H04W 36/305* (2018.08); *H04L 41/0645* (2013.01); *H04L 41/0659* (2013.01); *H04W 36/06* (2013.01); *H04W 76/18* (2018.02)

(58) Field of Classification Search
CPC ... H04W 36/305; H04W 36/06; H04W 76/18; H04L 41/0645; H04L 41/0659
See application file for complete search history.

(56) References Cited

U.S. PATENT DOCUMENTS

| | | | | |
|---|---|---|---|---|
| 10,433,165 | B2* | 10/2019 | Wang | H04W 72/20 |
| 2010/0208707 | A1* | 8/2010 | Hamabe | H04W 24/10 |
| | | | | 370/332 |
| 2013/0308489 | A1* | 11/2013 | Tomala | H04W 24/08 |
| | | | | 370/252 |
| 2014/0171085 | A1 | 6/2014 | Li | |
| 2017/0164221 | A1* | 6/2017 | Tan Bergström | H04W 76/18 |
| 2018/0249388 | A1* | 8/2018 | Baek | H04W 36/00698 |

(Continued)

FOREIGN PATENT DOCUMENTS

| CN | 108632926 | 10/2018 |
|---|---|---|
| CN | 108810960 | 11/2018 |

(Continued)

*Primary Examiner* — Huy D Vu
*Assistant Examiner* — Robert Ma
(74) *Attorney, Agent, or Firm* — Slater Matsil, LLP

(57) ABSTRACT

A communication method and a device are provided. The method includes: Two thresholds are set on a terminal device side: a first threshold and a second threshold. A terminal device may determine a cause for a radio link failure RLF based on a value relationship between a measurement result of a radio signal and the two thresholds, and further may use different handling manners depending on different RLF causes. According to the foregoing method, the terminal device can more accurately locate the cause for the RLF, and perform corresponding handling, to quickly resume communication, meet a service requirement of an industrial scenario, and the like.

20 Claims, 8 Drawing Sheets

(56) References Cited

U.S. PATENT DOCUMENTS

| | | |
|---|---|---|
| 2019/0053072 A1 | 2/2019 | Kundargi et al. |
| 2019/0082393 A1 | 3/2019 | Burugupalli et al. |
| 2020/0120552 A1 | 4/2020 | Yang et al. |
| 2020/0413470 A1* | 12/2020 | Yang .................... H04W 36/08 |

FOREIGN PATENT DOCUMENTS

| | | |
|---|---|---|
| CN | 108990116 A | 12/2018 |
| CN | 109302720 | 2/2019 |
| WO | 2018031162 | 2/2018 |
| WO | 2019237763 A1 | 12/2019 |

\* cited by examiner

COMMUNICATION METHOD AND DEVICE

CROSS-REFERENCE TO RELATED APPLICATIONS

This application is a continuation of International Application No. PCT/CN2019/128349, filed on Dec. 25, 2019, the disclosure of which is hereby incorporated by reference in its entirety.

TECHNICAL FIELD

Embodiments of this application relate to the field of communication technologies, and in particular, to a communication method and a device.

BACKGROUND

Wireless communication may be performed between a network device and a terminal device. When a failure occurs in the wireless communication between the network device and the terminal device, the failure needs to be found and rectified in time, to make the wireless communication between the network device and the terminal device proper.

Currently, the terminal device monitors, by measuring a radio signal sent by the network device, whether there is a failure in the wireless communication between the terminal device and the terminal device. If radio signal quality measured by the terminal device is lower than a preset threshold, the terminal device reports an out-of-synchronization signal to an upper protocol layer; otherwise, the terminal device reports a synchronization signal to the upper protocol layer. It is assumed that the upper protocol layer of the terminal device consecutively receives a first quantity of out-of-synchronization signals, and the terminal device starts a timer $T_{310}$. If a second quantity of synchronization signals are consecutively received in a running process of the timer, it is considered that a radio link has been recovered, the timer $T_{310}$ stops, and the terminal device continues to communicate with the network device. Otherwise, after the timer $T_{310}$ expires, the terminal device considers that a radio link failure (RLF) occurs, and initiates a radio resource control (RRC) reestablishment process.

In the foregoing solution, the terminal device is in a waiting state during a process from a time point at which the terminal device detects poor signal quality to a time point at which the terminal device reestablishes the radio link. In this case, the terminal device probably cannot normally communicate, and there may be a delay resulting from the reestablishment process initiated by the terminal device and a delay resulting from new reestablishment in the case of a possible reestablishment failure. Consequently, a communication requirement in an industrial scenario cannot be met.

SUMMARY

Embodiments of this application provide a communication method and a device, to determine a cause for an RLF, and use different handling manners depending on different causes for the RLF, to meet a communication requirement in an industrial scenario.

According to a first aspect, a communication method is provided. The method includes: A first network device sends a radio signal to a terminal device, where the radio signal is used for measuring or evaluating radio signal quality, and the radio signal may be a reference signal, a sounding signal, a measurement signal, another signal, or the like; the terminal device measures the radio signal, and determines a measurement result; the terminal device determines a first comparison result based on the measurement result and at least one of a first threshold or a second threshold; and the terminal device determines a first handling manner based on the first comparison result. The first threshold and the second threshold may be protocol-stipulated, or configured by a network device for the terminal device.

According to the foregoing method, two thresholds are set on the terminal device side: the first threshold and the second threshold. Three service scenarios may be determined based on a value relationship between the measurement result of the radio signal and the foregoing two thresholds. Compared with a solution in which one threshold is set on the terminal device side and only two service scenarios can be determined based on a value relationship between the threshold and the measurement result of the radio signal, this solution can be used for a more fine-grained service scenario division, so that a failure can be more accurately located and corresponding handling may be performed. For example, in some scenarios (for example, a device fault occurs in an industrial scenario), communication can be resumed more quickly, a service interruption delay is reduced, and a communication requirement in the industrial scenario is met.

It should be noted that in designs of this application, an example in which two thresholds are set and three scenarios are classified is used for description, but this is not intended to limit embodiments of this application. For example, in embodiments of this application, three thresholds may alternatively be set, and four scenarios are classified.

In a possible design, when the first comparison result is that the measurement result is greater than or equal to the first threshold, the first handling manner is that the terminal device determines that wireless communication between the terminal device and the first terminal device is normal. When the first comparison result is that the measurement result is less than the first threshold and greater than or equal to the second threshold, the first handling manner is that the terminal device determines that a first fault occurs and performs a first handling process. When the first comparison result is that the measurement result is less than the second threshold, the first handling manner is that the terminal device determines that a second fault occurs and performs a second handling process. Alternatively, the foregoing process may be described as follows. When the measurement result of the radio signal is greater than or equal to the first threshold, the terminal device may determine that wireless communication between the terminal device and the first network device is normal. When the measurement result of the radio signal is less than the first threshold and greater than or equal to the second threshold, the terminal device may determine that a first fault occurs and perform a first handling process. When the measurement result of the radio signal is less than the second threshold, the terminal device may determine that a second fault occurs and perform a second handling process.

In a possible design, that the first comparison result is that the measurement result is less than the second threshold may be specifically: Within running duration of a first timer, results of measuring the radio signal of the first network device by the terminal device are all less than the second threshold; or results of measuring the radio signal of the first network device by the terminal device for N consecutive times are all less than the second threshold, where N is a positive integer greater than 0.

According to the foregoing method, when "the first comparison result is less than the second threshold, the terminal device determines that the second fault occurs on the terminal device. However, in this design, it is determined that the second fault occurs on the terminal device only when "the first comparison result is less than the second threshold for a plurality of consecutive times or always less than the second threshold within a period of time. Therefore, a probability of misjudgment of a fault of the terminal device can be reduced.

In a possible design, the first network device may send configuration information of a second network device or configuration information of a cell corresponding to the second network device to the terminal device.

The configuration information of the second network device or the configuration information of the cell corresponding to the second network device includes one or more of the following information: identification information of the second network device, identification information of the cell corresponding to the second network device, frequency information of the cell corresponding to the second network device, or priority information of the cell corresponding to the second network device.

According to the foregoing method, when the second fault occurs on the terminal device, the terminal device may quickly access, based on the configuration information of the second network device or the configuration information of the cell corresponding to the second network device, the second network device for communication, to reduce a fault delay and meet a service requirement in the industrial scenario.

In a possible design, that the terminal device performs a second handling process includes: based on the configuration information of the second network device or the configuration information of the cell corresponding to the second network device, the terminal device reselects to the cell corresponding to the second network device or initiates a reestablishment process to the cell corresponding to the second network device.

According to the foregoing method, when determining a fault of the first network device, namely, the second fault, the terminal device performs the second handling process, to access the second network device for communication. This can ensure normal communication of the terminal device, avoid interruption of a communication service, and meet a service requirement in an industrial scenario.

In a possible design, a second network device may send a handover command to the terminal device, and the terminal device may be handed over, according to the handover command, from a cell corresponding to the first network device to a cell corresponding to the second network device.

In a possible design, the terminal device sends first indication information to the second network device, where the first indication information indicates that the second fault occurs, and the first indication information includes one or more of the following information: a cause for the fault, a type of the fault, the measurement result of the radio signal, or a measurement report of the radio signal.

According to the foregoing method, when determining that a fault occurs on the first network device, namely, the second fault, the terminal device sends the first indication information to the second network device, to indicate the fault of the first network device. Correspondingly, when receiving the first indication information, the second network device sends a handover indication command to the terminal device, to indicate the terminal device to be handed over from the cell corresponding to the first network device to the cell corresponding to the second network device. In this way, when determining that a fault occurs on the first network device, the terminal device notifies the second network device in time, to request to establish normal communication with the second network device. This reduces a fault delay, ensures normal communication of the terminal device, and meets a service requirement in an industrial scenario.

In a possible design, the first fault is a radio link failure RLF, and the second fault is a fault of the first network device.

According to a second aspect, a communication method is provided. The method includes: A first network device sends configuration information of a second network device or configuration information of a cell corresponding to the second network device to a terminal device; and the first network device sends a context of the terminal device and/or configuration information of the terminal device to the second network device.

According to the foregoing method, the first network device may send the configuration information of the second network device to the terminal device, and the first network device further sends the configuration information of the terminal device to the second network device. In this way, when a fault occurs on a communication link between the first network device and the terminal device, the terminal device may establish a normal communication link to the second network device in time based on the configuration information of the second network device. Correspondingly, the second network device may establish the normal communication link to the terminal device in time based on the configuration information of the terminal device. This ensures normal communication of the terminal device and meets a service requirement in an industrial scenario.

In a possible design, the configuration information of the second network device or the configuration information of the cell corresponding to the second network device includes one or more of the following information: identification information of the second network device, identification information of the cell corresponding to the second network device, frequency information of the cell corresponding to the second network device, or priority information of the cell corresponding to the second network device.

In a possible design, that the first network device sends a context of the terminal device and/or configuration information of the terminal device to the second network device includes: The first network device directly sends the context of the terminal device and/or the configuration information of the terminal device to the second network device; or the first network device sends handover indication information to the second network device, where the handover indication information includes the context of the terminal device and/or the configuration information of the terminal device.

In a possible design, the context of the terminal device includes security information, and/or the configuration information of the terminal device includes security information. The security information is used for security verification when the terminal device accesses the cell corresponding to the second network device.

According to a third aspect, a communication method is provided. The method includes: A second network device receives a context of a terminal device and/or configuration information of the terminal device from a first network device; and the second network device communicates with the terminal device based on the context of the terminal device and/or the configuration information of the terminal device.

According to the foregoing method, in a normal case, a communication link is established between the terminal device and the first network device. When a fault occurs on the first network device, the second network device may directly establish the communication link to the terminal device based on the configuration information of the terminal device that is sent by the first network device in advance. Compared with a manner in which the second network device requests the configuration information of the terminal device from the first network device when preparing to establish the communication link to the first network device, this can reduce link establishment duration, reduce a fault delay, and ensure a communication requirement of the terminal device.

In a possible design, that a second network device receives a context of a terminal device and/or configuration information of the terminal device from a first network device includes: The second network device directly receives the context of the terminal device and/or the configuration information of the terminal device from the first network device; or the second network device receives handover indication information from the first network device, where the handover indication information includes the context of the terminal device and/or the configuration information of the terminal device.

In a possible design, the context of the terminal device includes security information, and/or the configuration information of the terminal device includes security information. The security information is used for security verification when the terminal device accesses a cell corresponding to the second network device.

According to a fourth aspect, a communication method is provided. The method includes: A second network device sends a handover command to a terminal device, where the handover command indicates the terminal device to be handed over from a cell corresponding to a first network device to a cell corresponding to the second network device; and the second network device communicates with the terminal device.

In a possible design, the method further includes: The second network device receives first indication information from the terminal device, where the first indication information indicates that a second fault occurs, and the first indication information includes one or more of the following information: a cause for the fault, a type of the fault, a measurement result of a radio signal, or a measurement report of the radio signal.

According to the foregoing method, when determining that a fault occurs on the first network device, namely, the second fault, the terminal device sends the first indication information to the second network device, to indicate the fault of the first network device. Correspondingly, when receiving the first indication information, the second network device sends a handover indication command to the terminal device, to indicate the terminal device to be handed over from the cell corresponding to the first network device to the cell corresponding to the second network device. In this way, when determining that a fault occurs on the first network device, the terminal device notifies the second network device in time, to request to establish normal communication with the second network device. This reduces a fault delay, ensures normal communication of the terminal device, and meets a service requirement in an industrial scenario.

In a possible design, the method further includes: The second network device receives a context of the terminal device and/or configuration information of the terminal device from the first network device.

In a possible design, that the second network device receives a context of the terminal device and/or configuration information of the terminal device from the first network device includes: The second network device directly receives the context of the terminal device or the configuration information of the terminal device from the first network device; or the second network device receives handover indication information from the first network device, where the handover indication information includes the context of the terminal device and/or the configuration information of the terminal device.

According to a fifth aspect, a terminal device is provided. For beneficial effects of the terminal device, refer to the descriptions of the first aspect. Details are not described herein again. The terminal device has functions of implementing operations in the method embodiment of the first aspect. The functions may be implemented by hardware, or may be implemented by hardware executing corresponding software. The hardware or the software includes one or more units corresponding to the foregoing functions. In a possible design, a structure of the terminal device includes a communication unit and a processing unit. The communication unit and the processing unit may perform corresponding functions in the example in the first aspect. For specific functions, refer to descriptions in the first aspect.

According to a sixth aspect, a first network device is provided. For beneficial effects of the first network device, refer to the descriptions of the second aspect. Details are not described herein again. The first network device has functions of implementing operations in the method embodiment of the second aspect. The functions may be implemented by hardware, or may be implemented by hardware executing corresponding software. The hardware or the software includes one or more units corresponding to the foregoing functions. In a possible design, a structure of the first network device includes a communication unit. Further, the first network device may further include a processing unit. The communication unit and the processing unit may perform corresponding functions in the example in the second aspect. For specific functions, refer to descriptions in the second aspect.

According to a seventh aspect, a second network device is provided. For beneficial effects of the second network device, refer to the descriptions of the third aspect. Details are not described herein again. The second network device has functions of implementing operations in the method embodiment of the third aspect. The functions may be implemented by hardware, or may be implemented by hardware executing corresponding software. The hardware or the software includes one or more units corresponding to the foregoing functions. In a possible design, a structure of the second network device includes a communication unit and a processing unit. The communication unit and the processing unit may perform corresponding functions in the example in the third aspect. For specific functions, refer to descriptions in the third aspect.

According to an eighth aspect, a second network device is provided. For beneficial effects of the second network device, refer to the descriptions of the fourth aspect. Details are not described herein again. The second network device has functions of implementing operations in the method embodiment of the fourth aspect. The functions may be implemented by hardware, or may be implemented by hardware executing corresponding software. The hardware or the software includes one or more units corresponding to the foregoing functions. In a possible design, a structure of the second network device includes a communication unit.

Further, the second network device may further include a processing unit. The communication unit and the processing unit may perform corresponding functions in the example in the fourth aspect. For specific functions, refer to descriptions in the fourth aspect.

According to a ninth aspect, an apparatus is provided. The apparatus includes a processor, configured to implement the method described in any one of the first aspect to the fourth aspect. The apparatus may further include a memory, configured to store program instructions and data. The memory is coupled to the processor. When executing the program instructions stored in the memory, the processor may implement the method described in any one of the first aspect to the fourth aspect. The apparatus may further include a communication interface. The communication interface is configured to communicate with another device. For example, the communication interface may be a transceiver, a circuit, a bus, a module, or another type of communication interface.

According to a tenth aspect, a chip is provided. The chip includes a processor, configured to invoke a program stored in a memory, to perform the method according to any one of the first aspect to the fourth aspect.

According to an eleventh aspect, a computer-readable storage medium is provided. The computer-readable storage medium includes a program. When the program is run by a processor, the method according to any one of the first aspect to the fourth aspect is performed.

According to a twelfth aspect, a computer program product is provided. The computer program product includes instructions. When the instructions are run on a computer, the computer is enabled to perform the method according to any one of the first aspect to the fourth aspect.

According to a thirteenth aspect, a system is provided. The system includes the terminal device, the first network device, and/or the second network device according to any one of the foregoing aspects.

DETAILED DESCRIPTION OF ILLUSTRATIVE EMBODIMENTS

Figure 1:
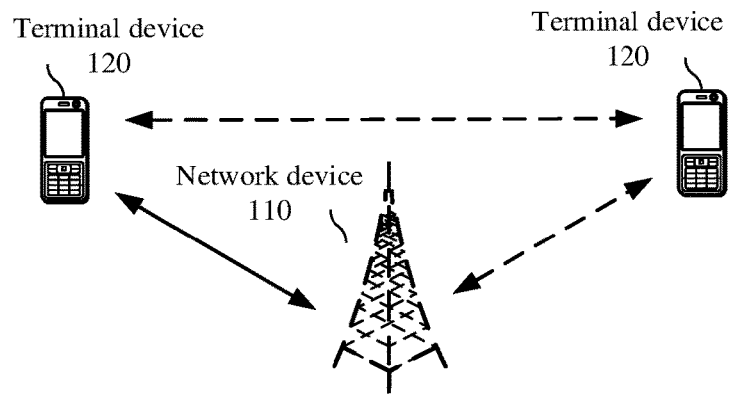
FIG. 1 is a schematic diagram of a communication system according to an embodiment of this application.

FIG. 1 shows a first communication system 100 to which an embodiment of this application is applied. The communication system 100 may include at least one network device 110. The network device 110 may be a device that communicates with a terminal device, for example, a base station or a base station controller. Each network device no may provide communication coverage for a specific geographical area, and may communicate with a terminal device located in the coverage area (a cell). The network device no may be an access network device. The access network device may also be referred to as a radio access network (RAN) device, and is a device that provides a wireless communication function for the terminal device. For example, the access network device includes but is not limited to: a next-generation base station (generation NodeB, gNB) in 5G, an evolved NodeB (evolved NodeB, eNB), a radio network controller (RNC), a NodeB (NB), a base station controller (base station controller, BSC), a base transceiver station (BTS), a home base station (for example, a home evolved NodeB or a home NodeB, HNB), a baseband unit (BBU), a transmission reception point (transmitting and receiving point, TRP), a transmission point (transmitting point, TP), a mobile switching center, and the like. Alternatively, the access network device may be a radio controller, a centralized unit (CU), and/or a distributed unit (DU) in a cloud radio access network (CRAN) scenario, or the network device may be a relay station, an access point, a vehicle-mounted device, a terminal device, a wearable device, a network device in a future 5G network, a network device in a future evolved public land mobile network (PLMN), or the like. The terminal device may communicate with a plurality of access network devices using different technologies. For example, the terminal device may communicate with an access network device supporting long term evolution (LTE), may communicate with an access network device supporting 5G, or may implement dual connectivity with an access network device supporting LTE and an access network device supporting 5G. This is not limited in embodiments of this application.

The communication system 100 further includes one or more terminal devices 120 within coverage of the network device no. The terminal device 120 may be mobile or fixed. The terminal device 120 may be briefly referred to as a terminal, and is a device having a wireless transceiver function. The terminal device may be deployed on land, and includes an indoor device, an outdoor device, a handheld device, or a vehicle-mounted device. The terminal device may alternatively be deployed on water (for example, on a ship), and may alternatively be deployed in air (for example, on a plane, a balloon, or a satellite). The terminal device may be a mobile phone, a tablet computer (pad), a computer having a wireless transceiver function, a virtual reality (VR) terminal device, an augmented reality (AR) terminal device, a wireless terminal device in industrial control, a wireless terminal device in self driving, a wireless terminal device in telemedicine (remote medical), a wireless terminal device in a smart grid, a wireless terminal device in transportation safety, a wireless terminal device in a smart city, or a wireless terminal device in a smart home, or may alternatively be user equipment (UE) or the like. Alternatively, the terminal device may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future fifth generation (the 5th generation, 5G) network, a terminal device in a future evolved public land mobile network (PLMN), or the like. Sometimes, the terminal device may also be referred to as user equipment (UE), an access terminal device, a vehicle-mounted terminal device, an industrial control terminal device, a UE unit, a UE station, a mobile station, a remote station, a remote terminal device, a mobile device, a UE terminal device, a wireless communication device, a UE agent, a UE apparatus, or the like. The terminal device may be fixed or movable. This is not limited in embodiments of this application.

Data may be transmitted between the network device 110 and the terminal device 120 using an air interface resource. The air interface resource may include at least one of a time domain resource, a frequency domain resource, or a code domain resource. Specifically, when data is transmitted between the network device and the terminal device, the network device may send control information to the terminal through a control channel, for example, a physical downlink control channel (PDCCH), to allocate a resource of a data channel, for example, a physical downlink shared channel (PDSCH) or a physical uplink shared channel (PUSCH) to the terminal. For example, the control information may indicate a symbol and/or a resource block (RB) to which the data channel is mapped, and the network device and the terminal device transmit data on the allocated time-frequency resource through the data channel. The data transmission may include downlink data transmission and/or uplink data transmission. The downlink data (for example, data carried on the PDSCH) transmission may be that the network device sends data to the terminal device, and the uplink data (for example, data carried on the PUSCH) transmission may be that the terminal device sends data to the network device. The data may be data in a broad sense, for example, may be user data, system information, broadcast information, or other information.

FIG. 1 shows one network device and two terminal devices as an example. Optionally, the communication system 100 may include a plurality of network devices, and another quantity of terminal devices may be included within coverage of one network device. This is not limited in this embodiment of this application.

Figure 2:
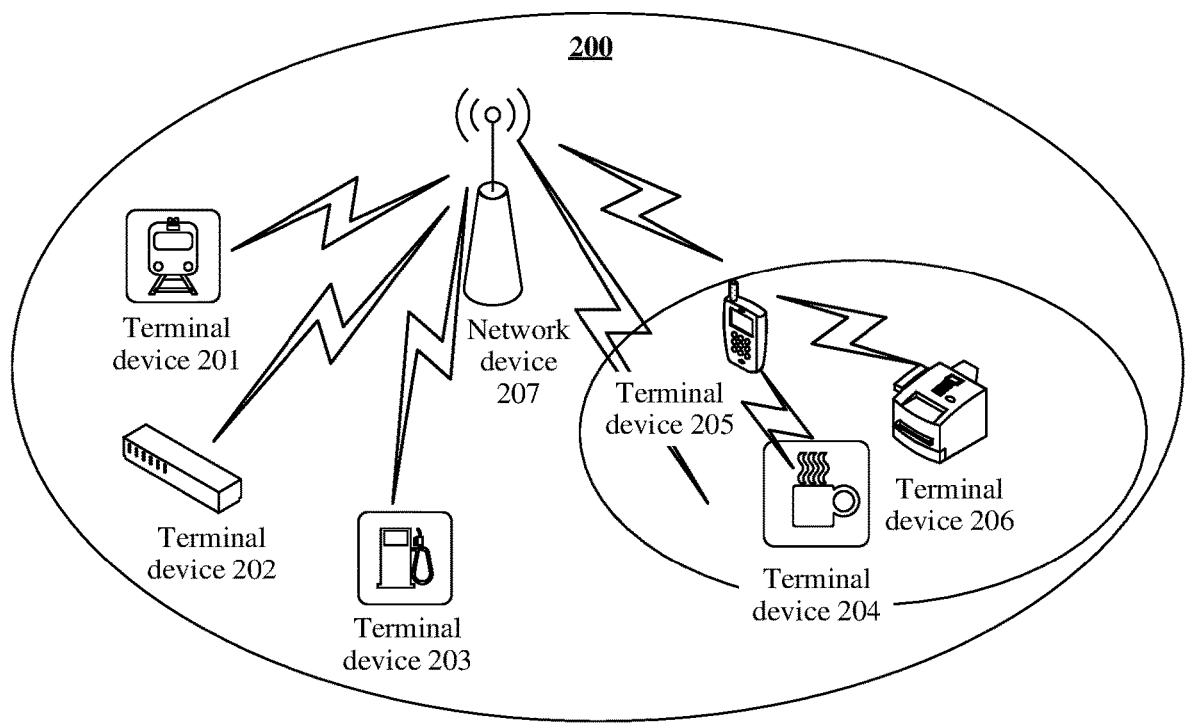
FIG. 2 is a schematic diagram of a communication system according to an embodiment of this application.

FIG. 2 shows a second communication system 200 to which an embodiment of this application is applied. The communication system 200 includes a terminal device 201, a terminal device 202, a terminal device 203, a terminal device 204, a terminal device 205, a terminal device 206, and a network device 207.

The terminal device 201 to the terminal device 206 and the network device 207 may constitute a communication system. In the communication system, at least one of the terminal device 201, the terminal device 202, the terminal device 203, the terminal device 204, the terminal device 205, or the terminal device 206 may send uplink data to the network device 207. The network device 207 may send downlink data to at least one of the terminal device 201, the terminal device 202, the terminal device 203, the terminal device 204, the terminal device 205, or the terminal device 206.

It may be understood that, in FIG. 2, in downlink transmission, the network device 207 may directly send downlink data to the terminal device 201, the terminal device 202, the terminal device 203, and the terminal device 205; and the terminal device 205 may forward the downlink data to the terminal device 204 and the terminal device 206. Similarly, in uplink transmission, the terminal device 204 and the terminal device 206 may send uplink data to the terminal device 205, and the terminal device 205 forwards the uplink data to the network device 207. FIG. 2 is merely an example for description, and is not intended to limit this embodiment of this application. For example, the network device 207 may directly send downlink data to the terminal device 204 and the terminal device 206, and the terminal device 204 and the terminal device 206 may directly send uplink data and the like to the network device 207.

Alternatively, still in FIG. 2, the terminal device 204, the terminal device 205, and the terminal device 206 may also constitute a communication system. In the communication system, the terminal device 205 may send downlink data to the terminal device 204 and the terminal device 206. The terminal device 204 and the terminal device 206 may send uplink data and the like to the terminal device 205.

FIG. 2 shows one network device and six terminal devices as an example. Optionally, the communication system 200 may include a plurality of network devices, and another quantity of terminal devices may be included within coverage of one network device. This is not limited in this embodiment of this application.

It may be understood that the communication method and the apparatus provided in embodiments of this application may be applied to a 4th generation (4G) communication system, for example, a long term evolution (LTE) system, a 5th generation (5G) communication system, for example, a new radio (NR) system, various future evolved communication systems such as the Internet of Things, the Internet of Vehicles, and a 6th generation (6G) communication system, or the like. This is not limited.

Further, in the following descriptions of embodiments of this application, terms such as "first" and "second", for example, "first network device", "second network device", "first threshold", and "second threshold", are used only for distinguishing and description, and cannot be understood as indication or implication of relative importance, indication or implication of an order, or the like. The term "at least one" means one or more, and the term "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" generally represents an "or" relationship between the associated objects. In addition, "at least one of the following items (pieces)" or a similar expression thereof indicates any combination of these items, including a single item (piece) or any combination of a plurality of items (pieces). For example, at least one item (piece) of a, b, or c may represent: a, b, c, a and b, a and c, b and c, or a, b, and c, where a, b, and c may be singular or plural.

Figures 3, 4:
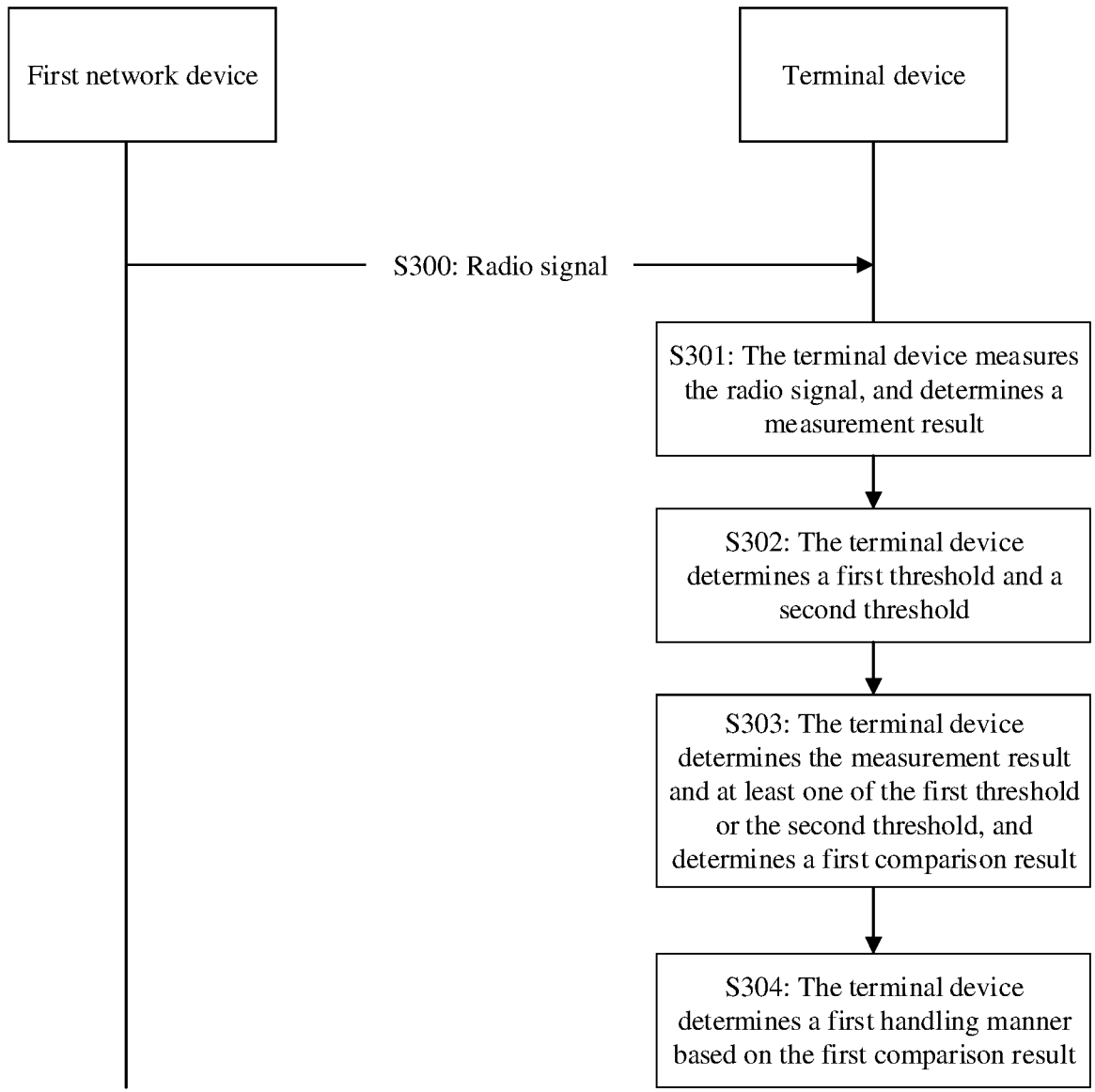
FIG. 3 is a flowchart of a communication method according to an embodiment of this application.
FIG. 4 is a schematic diagram of performing different handling processes depending on different thresholds according to an embodiment of this application.

FIG. 3 shows a procedure of a communication method. The method is performed by a terminal device, a first network device, and a second network device. The terminal device may be the terminal device 120 in FIG. 1, or may be any one of the terminal device 201 to the terminal device

206 in FIG. 2. The first network device or the second network device may be the network device no in FIG. 1, or may be the network device 207 in FIG. 2. The procedure includes the following steps.

S300: The first network device sends a radio signal to the terminal device. Accordingly, the terminal device receives the radio signal from the first network device.

The radio signal is used to measure or evaluate radio channel quality. The radio signal may be a reference signal, a sounding signal, a measurement signal, another signal, or the like. The reference signal may also be referred to as a pilot signal. The reference signal may include a synchronization signal/physical broadcast channel block (SSB/PBCH block, SSB), a channel state information reference signal (channel state information, CSI reference signal, CSI-RS), a channel sounding reference signal (SRS), and the like. This is not limited.

S301: The terminal device measures the radio signal, and determines a measurement result.

The terminal device may measure a receive power, receive quality, a signal-to-noise ratio, or the like of the radio signal, to obtain the measurement result. For example, the measurement result may be in a unit of decibel milliwatt (dBm), decibel (dB), or the like. This is not limited.

S302: The terminal device determines a first threshold and a second threshold, where a value of the first threshold is greater than a value of the second threshold.

Both the first threshold and the second threshold may be protocol-stipulated. Alternatively, both the first threshold and the second threshold may be configured by a network device for the terminal device. For example, the network device may configure the first threshold, the second threshold, and the like for the terminal device using signaling such as broadcast signaling, radio resource control (RRC) signaling, or media access control (MAC) signaling. Alternatively, the first threshold may be protocol-stipulated, and the second threshold may be configured by a network device for the terminal device. Alternatively, the first threshold is configured by a network device for the terminal device, and the second threshold is protocol-stipulated. This is not limited.

S303: The terminal device determines a first comparison result based on the measurement result and at least one of the first threshold or the second threshold.

The "at least one of the first threshold or the second threshold" may be specifically the first threshold, the second threshold, or the first threshold and the second threshold. In other words, in S303, the terminal device may determine the first comparison result based on the first threshold and the measurement result. Alternatively, in S303, the terminal device may determine the first comparison result based on the second threshold and the measurement result. Alternatively, in S303, the terminal device may determine the first comparison result based on the first threshold, the second threshold, and the measurement result. The first comparison result may be that the measurement result is greater than or equal to the first threshold, that the measurement result is less than the first threshold and greater than or equal to the second threshold, or that the measurement result is less than the second threshold. It may be understood that in the descriptions of embodiments of this application, "greater than or equal to" may be replaced with "greater than", "less than" may be replaced with "less than or equal to". This is not limited. It should be noted that, the description "the measurement result of the radio signal is greater than or equal to the first threshold" may specifically mean that a result of measuring the radio signal of the first network device by the terminal device once is greater than or equal to the first threshold. Alternatively, the description "the measurement result of the radio signal is greater than or equal to the first threshold" may mean that results of measuring the radio signal of the first network device by the terminal device for a plurality of consecutive or cumulative times (for example, N times, where N is an integer greater than i) are all greater than or equal to the first threshold. Alternatively, the description "the measurement result of the radio signal is greater than or equal to the first threshold" may mean that within running duration of a timer (for example, a first timer), results of measuring the radio signal of the first network device by the terminal device are all greater than or equal to the first threshold. Similarly, the description "the measurement result of the radio signal is less than the first threshold and greater than or equal to the second threshold" may specifically mean that a result of measuring the radio signal of the first network device by the terminal device once is less than the first threshold and greater than or equal to the second threshold. Alternatively, the description "the measurement result of the radio signal is less than the first threshold and greater than or equal to the second threshold" may mean that results of measuring the radio signal of the first network device by the terminal device for a plurality of consecutive or cumulative times are less than the first threshold and greater than or equal to the second threshold. Alternatively, the description "the measurement result of the radio signal is less than the first threshold and greater than or equal to the second threshold" may mean that within running duration of a timer, a result of measuring the radio signal of the first network device by the terminal device is less than the first threshold and greater than or equal to the second threshold. The description "the measurement result of the radio signal is less than the second threshold" may specifically mean that a result of measuring the radio signal of the first network device by the terminal device once is less than the second threshold. Alternatively, the description "the measurement result of the radio signal is less than the second threshold" may mean that results of measuring the radio signal of the first network device by the terminal device for a plurality of consecutive or cumulative times are less than the second threshold. Alternatively, the description "the measurement result of the radio signal is less than the second threshold" may mean that within running duration of a timer, results of measuring the radio signal of the first network device by the terminal device are all less than the second threshold.

For example, "a value relationship between a result of measuring the radio signal by the terminal device at a time, the first threshold, and the second threshold" is used as an example for description. For example, the first threshold is −11 dBm, the second threshold is −15 dBm, and the first threshold is greater than the second threshold. If the measurement result of the radio signal in S302 is −12 dBm, it may be determined that the first comparison result is that the measurement result is greater than the second threshold and less than the first threshold. Similarly, if the measurement result of the radio signal in S302 is −16 dBm, it may be determined that the first comparison result is that the measurement result is less than the second threshold. If the measurement result of the radio signal in S302 is −10 dBm, it may be determined that the first comparison result is that the measurement result is greater than the first threshold.

S304: The terminal device determines a first handling manner based on the first comparison result.

When the first comparison result in S303 is that the measurement result is greater than or equal to the first threshold, the first handling manner in S304 is that the terminal device determines that wireless communication between the terminal device and the first terminal device is normal. When the first comparison result in S303 is that the measurement result is less than the first threshold and greater than or equal to the second threshold, the first handling manner in S304 is that the terminal device determines that a first fault occurs, and performs a first handling process. When the first comparison result in S303 is that the measurement result is less than the second threshold, the first handling manner in S304 is that the terminal device determines that a second fault occurs, and performs a second handling process. Alternatively, the foregoing process may be described as follows. As shown in FIG. 4, when the measurement result of the radio signal is greater than or equal to the first threshold, the terminal device may determine that wireless communication between the terminal device and the first network device is normal. When the measurement result of the radio signal is less than the first threshold and greater than or equal to the second threshold, the terminal device may determine that a first fault occurs and perform a first handling process. When the measurement result of the radio signal is less than the second threshold, the terminal device may determine that a second fault occurs and perform a second handling process.

It can be learned from the foregoing that in this embodiment of this application, two thresholds are set on the terminal device side: the first threshold and the second threshold. Three service scenarios may be determined based on a value relationship between the measurement result of the radio signal and the foregoing two thresholds. Compared with a solution in which one threshold is set on the terminal device side and only two service scenarios can be determined based on a value relationship between the threshold and the measurement result of the radio signal, this solution can be used for a more fine-grained service scenario division, so that a failure can be more accurately located and corresponding handling may be performed. For example, in some scenarios (for example, a device fault occurs in an industrial scenario), communication can be resumed more quickly, and a service interruption delay can be reduced. It should be noted that the example in which three scenarios are specified by specifying two thresholds in the present invention is used. Further, four scenarios may be specified by specifying three thresholds, and corresponding handling is separately performed for the four scenarios. Other cases can be deduced by analogy.

The first fault may be a radio link failure (RLF). The first handling process corresponding to the first fault may be: The terminal device starts a timer $T_{310}$. If an upper layer of the terminal device continuously receives a second quantity (for example, $N_{311}$) of synchronization signals in a running process of the timer $T_{310}$, it is considered that a radio link is resumed and a communication requirement is met, then the timer $T_{310}$ is stopped, and communication continues. If the timer $T_{310}$ is not stopped, the timer $T_{310}$ runs until the timer $T_{310}$ expires. After the timer $T_{310}$ expires, the terminal device needs to execute an RRC reestablishment process to resume communication. It should be noted that, in the running process of the timer $T_{310}$, a physical layer of the terminal device continuously detects radio signal quality of the first network device. If the radio signal quality of the first network device is greater than or equal to the first threshold, the physical layer of the terminal device reports a synchronization signal to the upper layer; otherwise, the physical layer of the terminal device reports an out-of-synchronization signal to the upper layer. The synchronization signal may include a $Q_{in}$ signal, an in sync signal, or the like. The out-of-synchronization signal may include a $Q_{out}$ signal, an out of sync signal, or the like. This is not limited.

The second fault may be a fault of the first network device. Alternatively, the second fault may be a fault caused when the terminal device moves to a place with poor signal quality, for example, an elevator, a basement, or a garage. Alternatively, the second fault may be signal blocking caused by an obstacle between the first network device and the terminal device. The second handling process corresponding to the second fault may be: Based on configuration information of the second network device, the terminal device reselects to a cell corresponding to the second network device, initiates a reestablishment process to a cell corresponding to the second network device, or is handed over to a cell corresponding to the second network device.

It can be learned from the foregoing analysis that in this embodiment of this application, the terminal device may determine two types of faults: the first fault and the second fault. However, in a solution, the terminal device side may determine only the first fault. However, restoration duration of the first handling process corresponding to the first fault is long, and a service interruption delay is long. In this embodiment of this application, in addition to determining the first fault, the terminal device may further determine the second fault. Restoration duration of the second handling process corresponding to the second fault is short, and a service interruption delay is short, so that a communication requirement in an industrial scenario can be met.

For example, when a radio link is normal, the terminal device and the first network device are in a connected mode, and the terminal device and the second network device are in a non-connected mode. When determining that the second fault occurs (that is, a fault occurs on the first network device), the terminal device may communicate with the second network device. Optionally, to enable the terminal device to quickly access the second network device, the first network device may send the configuration information of the second network device to the terminal device in advance. In addition, the first network device may send a context and/or configuration information of the terminal device to the second network device. Alternatively, the foregoing process may be described as follows: The first network device sends the configuration information of the second network device to the terminal device, and accordingly, the terminal device receives the configuration information of the second network device from the first network device. The first network device sends a context of the terminal device and/or configuration information of the terminal device to the second network device. Accordingly, the second network device receives the context of the terminal device and/or the configuration information of the terminal device from the first network device. The context of the terminal device or the configuration information of the terminal device may be directly transmitted. To be specific, the first network device sends the context of the terminal device and/or the configuration information of the terminal device to the second network device. Alternatively, the context of the terminal device or the configuration information of the terminal device may be carried in handover indication or handover request information for transmission. To be specific, the first network device sends the handover indication or handover request indication information to the second network device, where the handover indication or handover request information carries the context of the terminal device and/or the configuration information of the terminal device. Optionally, when the terminal device may establish an RRC connection to the first network device, or after the terminal device establishes an RRC connection to the first network device, the first network device performs the step of "sending the context and/or the configuration information of the terminal device to the second network device". Similarly, when the terminal device may establish the RRC connection to the first network device, or after the terminal device establishes the RRC connection to the first network device, the first network device performs the step of "sending the configuration information of the second network device to the terminal device". The first network device and the second network device may communicate with each other through an Xn interface. For example, the first network device may send the context and/or the configuration information of the terminal device to the second network device through the Xn interface.

The configuration information of the second network device may also be referred to as configuration information of the cell corresponding to the second network device. In the following embodiment, the configuration information of the second network device is used as an example for description. The configuration information of the second network device may include one or more of the following information: identification information of the second network device, identification information of the cell corresponding to the second network device, frequency information of the cell corresponding to the second network device, priority information of the cell corresponding to the second network device, or the like. The context of the terminal device may include security information, or the configuration information of the terminal device may include security information. The security information is used for security verification when the terminal device accesses the cell corresponding to the second network device.

Figure 5:
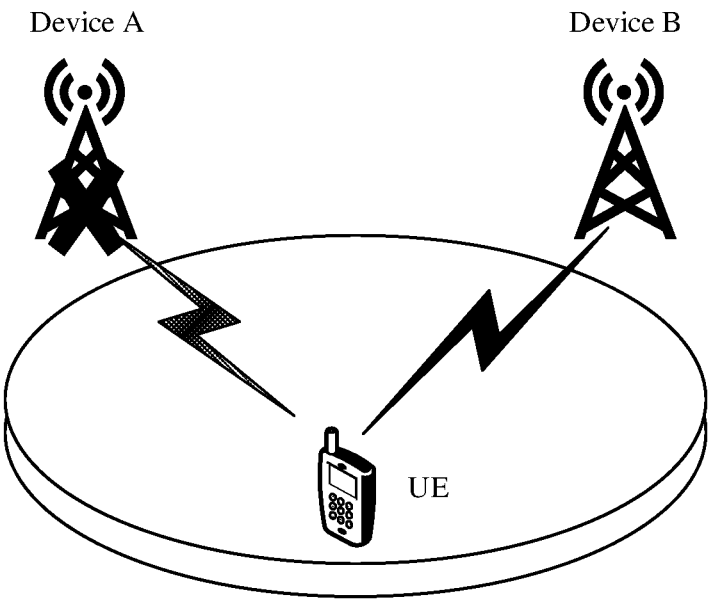
FIG. 5 is a schematic diagram of networking of a device A/a device B according to an embodiment of this application.

For the foregoing example, FIG. 5 shows a specific implementation. In this implementation, the method provided in FIG. 3 is described in detail by using an example in which the first network device is a device A, the second network device is a device B, the terminal device is UE, the second fault is a fault of the device A, and the radio signal is a reference signal.

In FIG. 5, in a normal case, the UE communicates with the device A, the UE and the device A are in a connected mode, and the UE and the device B are in a non-connected mode. When a fault occurs on the device A, the UE accesses the device B for communication. The UE detects the reference signal sent by the device A, so that the UE performs corresponding operations when different conditions are met. For example, when determining that a fault occurs on the device A, the UE quickly communicates with the device B instead.

(1) When the UE establishes a radio resource control (RRC) connection in a cell of the device A or after establishment of the RRC connection is completed, the device A sends configuration information related to a cell of the device B to the UE, so that the UE can quickly access a cell B for communication when a specific condition is met. The configuration information related to the cell of the device B includes one or more of the following items: a cell identifier, a base station identifier, cell frequency information, a cell priority, a security parameter, and the like.

(2) The device A sends a context of the UE and/or configuration information of the UE to a cell of the device B through an Xn interface, so that reestablishment can be successfully completed when the UE accesses the cell of the device B. The context or the configuration information may carry verification information, so that security verification may be performed when the UE accesses the cell of the device B. The security verification may be integrity verification or decryption.

(3) The device A may periodically send the reference signal to the UE, and the UE detects the reference signal sent by the device A, to obtain quality of the reference signal. Based on a value relationship between the quality of the reference signal, a first threshold, and a second threshold, different handling is performed. The first threshold and the second threshold may be protocol-stipulated, or the first threshold and the second threshold may be configured by the device A for the terminal device, for example, configured for the UE through RRC or media access control (MAC). It should be noted that the following description "lower than" may represent "less than", and "higher than" may represent "greater than or equal to". Alternatively, "lower than" may represent "less than or equal to", and "higher than" may represent "greater than". This is not limited.

(3.1) If reference signal quality that is of the device A and that is measured by the UE is higher than the first threshold, the UE determines that no fault occurs on a radio link and the device A, and wireless communication can be performed normally. A physical layer of the UE may report a synchronization signal to an upper layer or perform no special action, where the synchronization signal indicates that the signal quality is normal, and the synchronization signal may be a $Q_{in}$ signal, an in sync signal, or the like. This is not limited.

(3.2) If reference signal quality that is of the device A and that is measured by the UE is lower than the first threshold and higher than the second threshold, the UE determines that a fault occurs in wireless communication and normal wireless communication cannot be completed. A physical layer of the UE reports an out-of-synchronization signal to an upper layer, where the out-of-synchronization signal may include a $Q_{out}$ signal, an out of sync signal, or the like. When the upper layer of the UE receives N out-of-synchronization signals, a timer T30 is started. If a second quantity (for example, $N_{311}$) of synchronization signals are consecutively received in a running process of the timer, it is considered that a radio link is resumed and a communication requirement can be met, then the timer $T_{310}$ is stopped, and communication continues. If the timer is not stopped, the timer runs until the timer expires. After the timer expires, the UE determines that an RLF occurs at this time, and needs to execute an RRC reestablishment process to resume communication.

Figure 6:
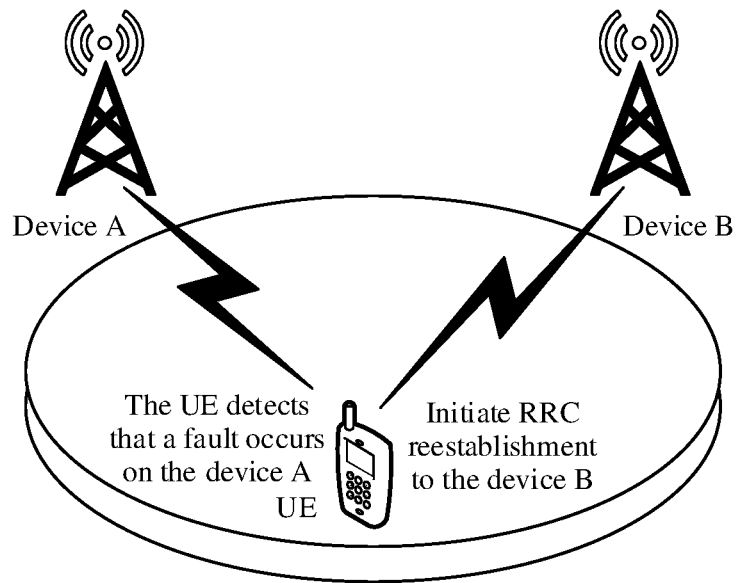
FIG. 6 is a schematic diagram of resuming a radio link according to an embodiment of this application.

(3.3) If signal quality that is of the device A and that is measured by the UE is lower than the second threshold, the UE starts a timer T, where duration of the timer T is configured by the device A or protocol-stipulated. In a running process of the timer T, if the signal quality that is of the device A and that is measured by the UE is higher than the first threshold, the UE returns to continuing to perform the foregoing (3.1), and the timer T is stopped. Alternatively, in a running process of the timer T, if the signal quality that is of the device A and that is measured by the UE is lower than the first threshold but higher than the second threshold, the UE returns to performing the foregoing (3.2), and the timer T is stopped. Alternatively, in a running process of the timer T, if the signal quality that is of the device A and that is measured by the UE is always lower than the second threshold, after the timer T expires, the UE determines that a fault occurs on the device A. In this case, as shown in FIG. 6, the UE may initiate an RRC reestablishment process to a cell of the device B based on configuration information of the cell of the device B, access the cell of the device B, and communicate with the device B. Optionally, the process of the foregoing (3.3) may be replaced with the following. If signal quality that is of the device A and that is measured by the UE for M consecutive times is always lower than the second threshold, the UE determines that a fault occurs on the device A, and initiates the RRC reestablishment process to a cell of the device B, where M is an integer greater than 0.

It can be learned from the above that, the UE may determine, based on the reference signal quality and the threshold, a specific type of fault occurs in current communication. When it is determined that a fault occurs on the device A, the UE may quickly initiate a reestablishment process to the cell of the device B, and quickly access the cell of the device B to perform normal communication.

For example, in this embodiment of this application, in a normal case, the terminal device may be in a connected mode (in other words, may perform communication through a dedicated link) with both the first network device and the second network device. When the terminal device determines that the second fault occurs (that is, a fault occurs on the first network device), the terminal device may send first indication information to the second network device. The first indication information indicates that the second fault occurs. The first indication information may include one or more of the following information: a cause for the fault, a type of the fault, a measurement result of a radio signal, a measurement report of the radio signal, or the like. After receiving the first indication information from the terminal device, the second network device may send a handover command to the terminal device. The handover command indicates the terminal device to be handed over from a cell corresponding to the first network device to a cell corresponding to the second network device. Accordingly, the terminal device receives the handover command from the second network device, and is handed over, according to the handover command, from the cell corresponding to the first network device to the cell corresponding to the second network device. Optionally, to enable the terminal device to be quickly handed over from the first network device to the second network device, the first network device may send a context of the terminal device and/or configuration information of the terminal device to the second network device in advance. Accordingly, the second network device receives the context of the terminal device and/or the configuration information of the terminal device from the first network device. Optionally, the first network device may directly send the context of the terminal device and/or the configuration information of the terminal device to the second network device, that is, the first network device may send the context of the terminal device and/or the configuration information of the terminal device to the second network device. Accordingly, the second network device receives the context of the terminal device and/or the configuration information of the terminal device from the first network device. Alternatively, the first network device may indirectly send the context of the terminal device and/or the configuration information of the terminal device to the second network device. For example, the first network device may send handover indication information to the second network device, where the handover indication information may carry the context of the terminal device and/or the configuration information of the terminal device. Accordingly, the second network device may receive the handover indication information from the first network device.

Figure 7:
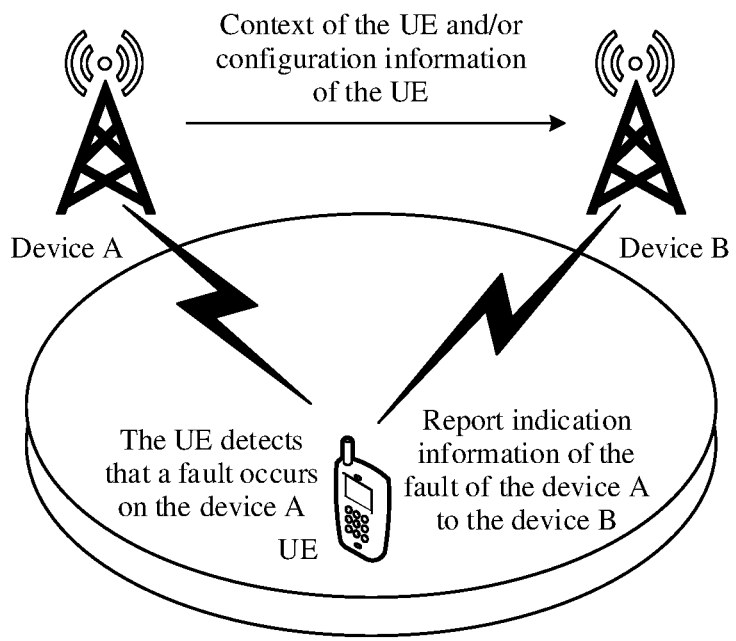
FIG. 7 is a schematic diagram of dual connectivity-based fault detection according to an embodiment of this application.

For the foregoing example, FIG. 7 shows a specific implementation. In this implementation, the method provided in FIG. 3 is described in detail by using an example in which the first network device is a device A, the second network device is a device B, the terminal device is UE, the second fault is a fault of the device A, and the radio signal is a reference signal.

In FIG. 7, the device A is a primary base station, and the device A may add the device B as a secondary base station. In this case, the UE is in a connected mode for both the device A and the device B, so that the UE and the device B can directly communicate with each other. When the device A normally communicates with the UE, the UE may communicate with the device B, or the UE may not communicate with the device B. This is not limited.

(1) When the device A is normal, the device A sends a context of the UE and/or configuration information of the UE to the device B. The context of the UE and/or the configuration information of the UE may be carried in handover indication information. For example, the device A may first send the handover indication information to the device B, where the handover indication information carries the context of the UE and/or the configuration information of the UE, and the handover indication information indicates the device B to send a handover command to the UE when a fault occurs on the device A. After receiving the handover indication information, the device B sends acknowledgment information to the device A. Alternatively, the context of the UE or the configuration information of the UE may be separately sent. This is not limited. For example, the device A may first send a handover indication request to the device B, and the device B sends acknowledgment information to the device A after receiving the handover indication information. Then, the device A sends the context of the UE and/or the configuration information of the UE to the device B.

Figure 8:
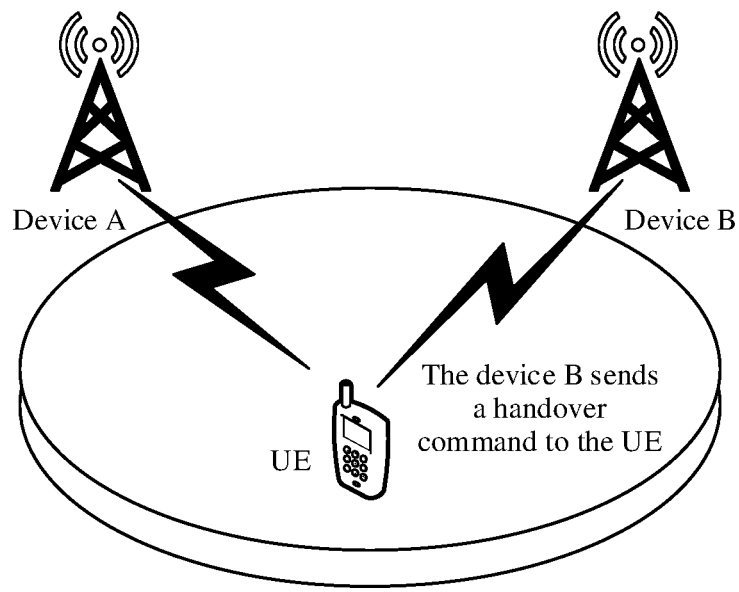
FIG. 8 is a schematic diagram of resuming a radio link according to an embodiment of this application.

(2) The UE may detect the reference signal of the device A by using the method shown in the foregoing procedure in FIG. 3. When determining that a fault occurs on the device A, the UE sends indication information to the device B, where the indication information indicates that the fault occurs on the device A, or the indication information indicates that communication between the UE and the device A fails. The indication information may carry at least one of the following: a reason for sending the indication information, a type of the failure (which may be a device fault or that reference signal quality is lower than a specified threshold), a measurement result, a measurement report, and the like. After the device B receives the indication information, the device B may send a handover command to the UE, as shown in FIG. 8. The UE may be handed over, according to the handover command, from a cell corresponding to the first network device to a cell corresponding to the second network device.

According to the foregoing method, the UE may detect the device A. When detecting that a fault occurs on the device A, the UE may be handed over to the device B for communication, so that the UE can quickly resume communication, and an interruption delay is reduced.

Figure 9:
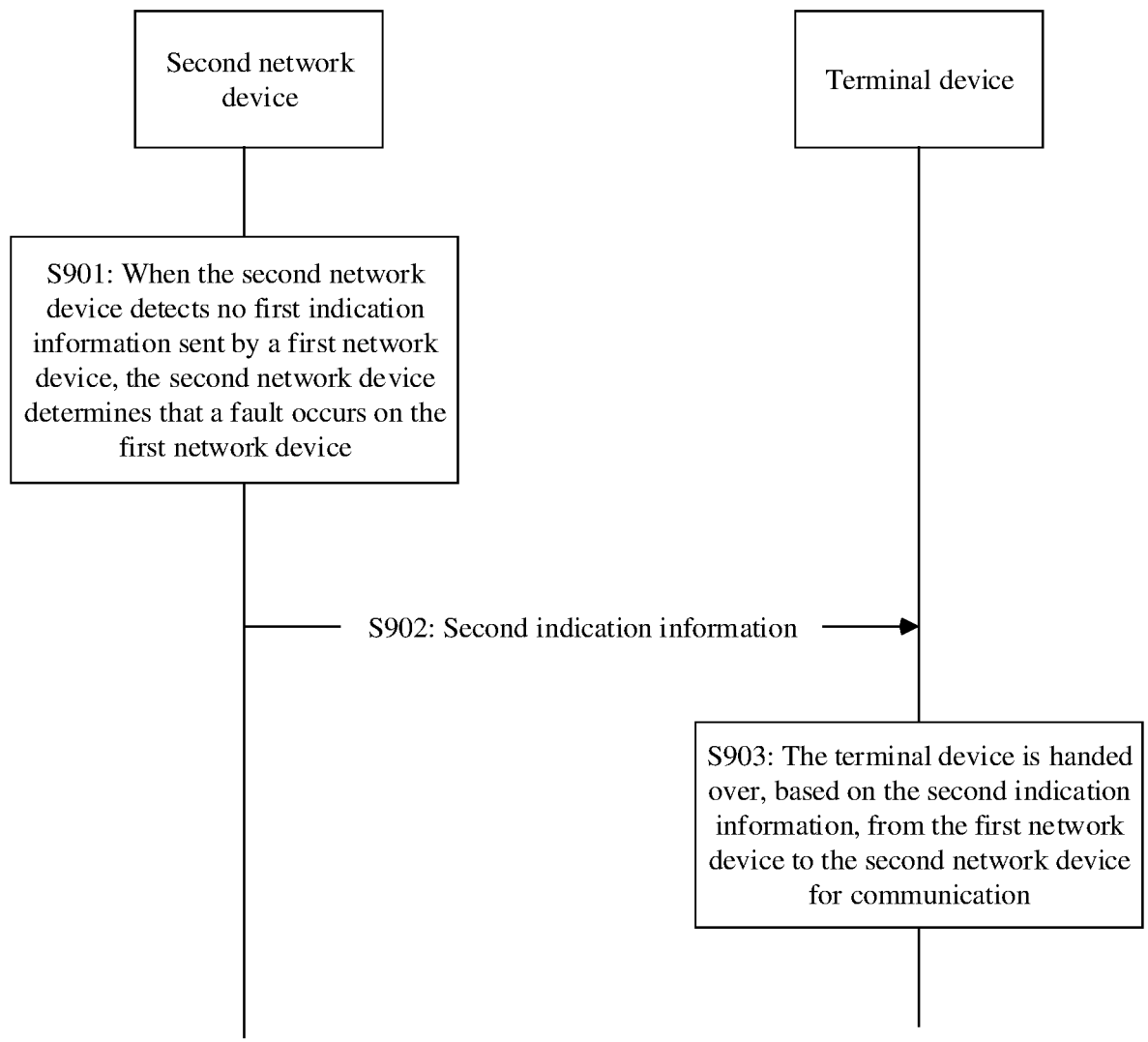
FIG. 9 is a flowchart of a communication method according to an embodiment of this application.

FIG. 9 shows a procedure of a communication method. The method is performed by a terminal device, a first network device, and a second network device. The terminal device may be the terminal device 120 in FIG. 1, or may be any one of the terminal device 201 to the terminal device 206 in FIG. 2. The first network device or the second network device may be the network device no in FIG. 1, or may be the network device 207 in FIG. 2. The procedure includes the following steps.

S901: When the second network device detects no first indication information sent by the first network device, the second network device determines that a fault occurs on the first network device, where the first indication information indicates that the first network device is in a normal working state.

Optionally, in a normal case, the first network device may periodically send the first indication information to the second network device, where the first indication information indicates that the first network device is in the normal working state. When the second network device detects or receives no first indication information of the first network device for N consecutive times or within a period of time, it may be considered that a fault occurs on the first network device.

S902: The second network device sends second indication information to the terminal device, where the second indication information indicates that a fault occurs on the first network device, or the second indication information indicates the terminal device to be handed over from the first network device to the second network device for communication.

S903: The terminal device is handed over, based on the second indication information, from the first network device to the second network device for communication.

It can be learned from the foregoing that the second network device may detect the first network device. When detecting that a fault occurs on the first network device, the second network device sends indication information to the terminal device. The terminal device is handed over to the second network device for communication, so that the terminal device can quickly resume communication, and an interruption delay is reduced.

Optionally, the first network device may send a context of the terminal device and/or configuration information of the terminal device to the second network device in advance. Accordingly, the second network device may receive the context of the terminal device and/or the configuration information of the terminal device from the first network device. Alternatively, the first network device may send handover indication information to the second network device, where the handover indication information carries the context of the terminal device and/or the configuration information of the terminal device. Accordingly, the second network device receives the handover indication information from the first network device.

Figure 10:
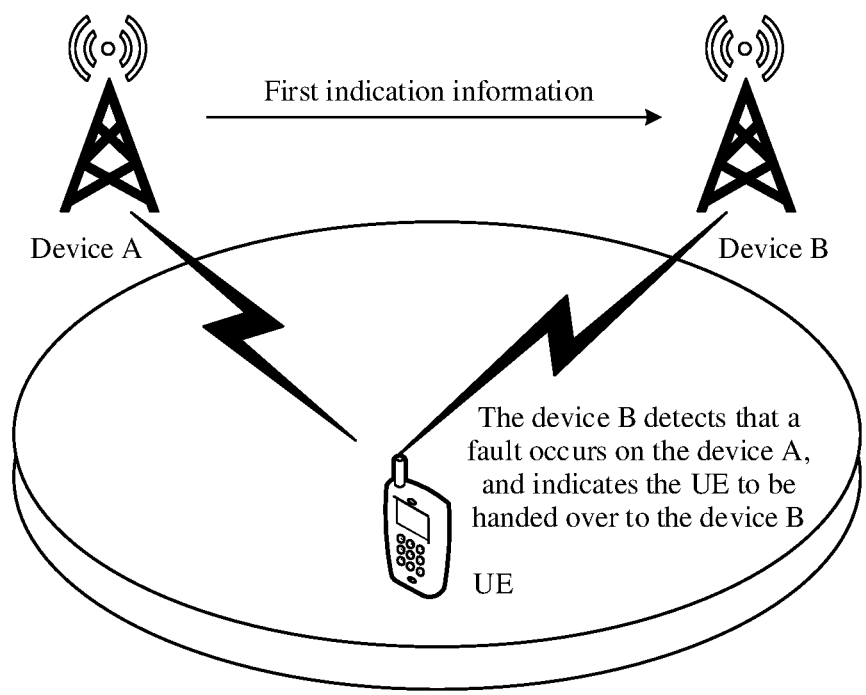
FIG. 10 is a schematic diagram of resuming a radio link according to an embodiment of this application.

In this embodiment of this application, as shown in FIG. 10, the method provided in FIG. 9 is described in detail by using an example in which the first network device is a device A, the second network device is a device B, the terminal device is UE, a second fault is a fault of the device A, and a radio signal is a reference signal.

In FIG. 10, the device A is a primary base station, and the device A may add the device B as a secondary base station. In this case, the UE is in a connected mode for both the device A and the device B, so that the UE and the device B can directly communicate with each other. When the device A normally communicates with the UE, the UE communicates with the device B, or the UE may not communicate with the device B. This is not limited.

(1) When the device A is normal, the device A may send the context of the UE and/or the configuration information of the UE to the device B. The context of the UE and/or the configuration information of the UE may be directly transmitted, or the context of the UE and/or the configuration information of the UE may be carried in the handover indication information.

(2) The device A may periodically send the indication information to the device B, to indicate that the device A is in the normal working state. It is assumed that the device B receives no indication information of the device A within a period of time or for N consecutive times, so that the device B may determine that a fault occurs on the device A. Then, the device B may send the indication information to the UE, and the UE may be handed over to a cell of the device B based on the indication information, to communicate with the device B.

Figure 11:
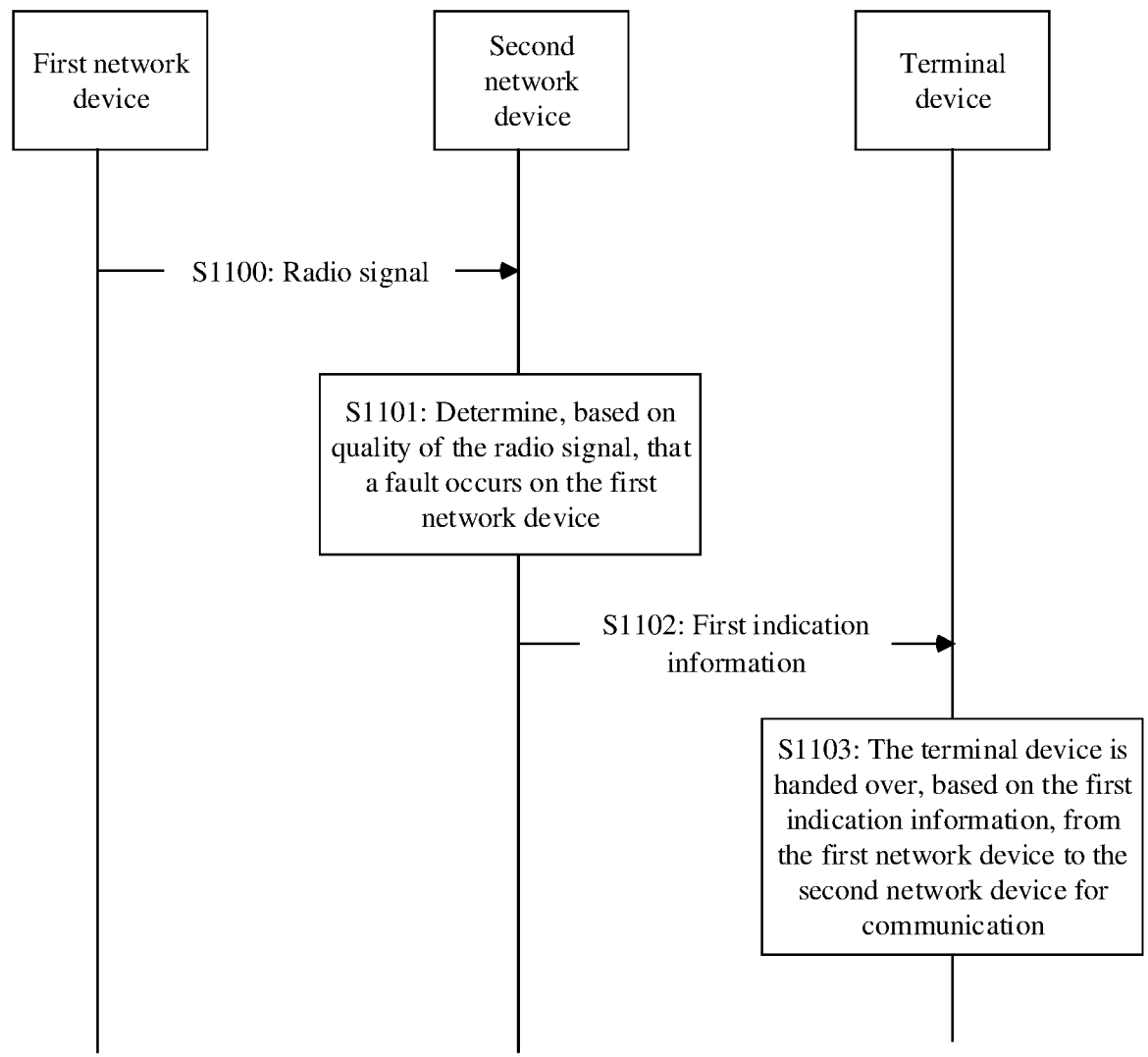
FIG. 11 is a flowchart of a communication method according to an embodiment of this application.

FIG. 11 shows a procedure of a communication method. The method is performed by a terminal device, a first network device, and a second network device. The terminal device may be the terminal device 120 in FIG. 1, or may be any one of the terminal device 201 to the terminal device 206 in FIG. 2. The first network device or the second network device may be the network device no in FIG. 1, or may be the network device 207 in FIG. 2. The procedure includes the following steps.

S1100: The first network device sends a radio signal to the second network device. Accordingly, the second network device receives the radio signal from the first network device, where the radio signal may include a reference signal and the like.

S1101: The second network device determines that a fault occurs on the first network device based on quality of the radio signal. Optionally, when the quality of the radio signal of the first network device is less than or equal to a first threshold, it may be considered that a fault occurs on the first network device; otherwise, it is considered that the first network device is in a normal working state.

S1102: The second network device sends first indication information to the terminal device, where the first indication information indicates that a fault occurs on the first network device, or the first indication information indicates the terminal device to be handed over from the first network device to the second network device for communication.

S1103: The terminal device is handed over, based on the first indication information, from the first network device to the second network device for communication.

Optionally, the first network device may send a context of the terminal device and/or configuration information of the terminal device to the second network device in advance. The context of the terminal device and/or the configuration information of the terminal device may be transmitted in other signaling, or the context of the terminal device and/or the configuration information of the terminal device may be carried in handover indication information for transmission. This is not limited.

It can be learned from the foregoing that the second network device may detect the first network device. When detecting that a fault occurs on the first network device, the second network device sends indication information to the terminal device. The terminal device is handed over to the second network device for communication, so that the terminal device can quickly resume communication, and an interruption delay is reduced.

In this embodiment of this application, the method provided in FIG. 11 is described in detail by using an example in which the first network device is a device A, the second network device is a device B, the terminal device is UE, and a second fault is a fault of the device A.

The device A is a primary base station, and the device A may add the device B as a secondary base station. In this case, the UE is in a connected mode for both the device A and the device B, so that the UE and the device B can directly communicate with each other. When the device A normally communicates with the UE, the UE communicates with the device B, or the UE may not communicate with the device B. This is not limited.

(1) When the device A is normal, the device A may send the context of the UE and/or the configuration information of the UE to the device B. The context of the UE and/or the configuration information of the UE may be directly transmitted, or the context of the UE and/or the configuration information of the UE may be carried in the handover indication information. This is not limited.

(2) The device A may periodically send the radio signal to the device B. It is assumed that the radio signal of the device A received by the device B within a period of time or for N consecutive times is less than or equal to the first threshold, so that the device B may determine that a fault occurs on the device A. Then, the device B may send the indication information to the UE, and the UE may be handed over to a cell of the device B based on the indication information, to communicate with the device B.

Embodiments described in this specification may be independent solutions, or may be combined based on internal logic. These solutions all fall within the protection scope of this application.

It may be understood that in the foregoing method embodiments, methods and operations implemented by the terminal device may alternatively be implemented by a component (for example, a chip or a circuit) of the terminal device. Methods and operations implemented by the network device may alternatively be implemented by a component (for example, a chip or a circuit) of the network device. In embodiments provided in this application, the methods provided in embodiments of this application are described from perspectives of the network device, the terminal, and interaction between the network device and the terminal. To implement functions in the foregoing methods provided in embodiments of this application, the network device and the terminal may include a hardware structure and/or a software module, and implement the foregoing functions in a form of the hardware structure, the software module, or a combination of the hardware structure and the software module. Whether a specific function in the foregoing functions is performed by the hardware structure, the software module, or the combination of the hardware structure and the software module depends on specific applications and design constraints of the technical solutions.

The methods provided in embodiments of this application are described above in detail with reference to FIG. 1 to FIG. 11. Apparatuses provided in embodiments of this application are described below in detail with reference to FIG. 12 and FIG. 13. It should be understood that descriptions of apparatus embodiments correspond to the descriptions of the method embodiments. Therefore, for content that is not described in detail, refer to the descriptions in the foregoing method embodiments.

Figure 12:
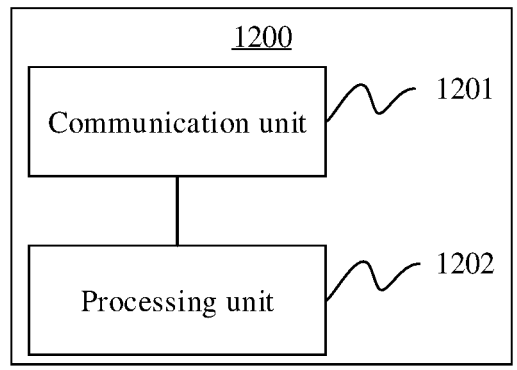
FIG. 12 is a schematic diagram of a structure of an apparatus according to an embodiment of this application.

FIG. 12 is a schematic block diagram of an apparatus 1200 according to an embodiment of this application. The apparatus 1200 is configured to implement functions of the network device or the terminal device in the foregoing methods. For example, the apparatus may be a software module or a chip system. The chip system may include a chip, or may include a chip and another discrete device. The apparatus 1200 includes a communication unit 1201, and may further include a processing unit 1202. The communication unit 1201 may communicate with the outside. The processing unit 1202 is configured for handling. The communication unit 1201 may include a sending unit and/or a receiving unit, respectively configured to perform sending or receiving steps of the terminal device or the network device in the procedures in FIG. 1 to FIG. 11.

In an example, the apparatus 1200 may implement the steps corresponding to the terminal device in the procedure shown in FIG. 3. The apparatus 1200 may be a terminal device, or a chip or a circuit configured in the terminal device. The communication unit 1201 is configured to perform a sending/receiving-related operation on a terminal device side in the foregoing method embodiments. The processing unit 1202 is configured to perform a handling-related operation of the terminal device in the foregoing method embodiments.

For example, the communication unit 1201 is configured to receive a radio signal from a first network device. The processing unit 1202 is configured to: measure the radio signal, determine a measurement result, determine a first threshold and a second threshold, determine a first comparison result based on the measurement result and at least one of the first threshold or the second threshold, and determine a first handling manner based on the first comparison result. A value of the first threshold is greater than a value of the second threshold.

Optionally, when determining the first handling manner based on the first comparison result, the processing unit 1202 is specifically configured to:

The first comparison result is that the measurement result is greater than or equal to the first threshold, and the first handling manner is to determine that wireless communication between the terminal device and the first network device is normal; the first comparison result is that the measurement result is less than the first threshold and greater than or equal to the second threshold, and the first handling manner is to determine that a first fault occurs, and perform a first handling process; or the first comparison result is that the measurement result is less than the second threshold, and the first handling manner is to determine that a second fault occurs, and perform a second handling process.

Optionally, that the first comparison result is that the measurement result is less than the second threshold includes: within running duration of a first timer, measurement results of the radio signal of the first network device are all less than the second threshold; or results of measuring the radio signal of the first network device for N consecutive times are all less than the second threshold, where N is a positive integer greater than 0.

Optionally, the communication unit 1201 is further configured to receive configuration information of a second network device or configuration information of a cell corresponding to the second network device from the first network device. The configuration information of the second network device or the configuration information of the cell corresponding to the second network device includes one or more of the following information: identification information of the second network device, identification information of the cell corresponding to the second network device, frequency information of the cell corresponding to the second network device, or priority information of the cell corresponding to the second network device.

Optionally, when performing the second handling process, the processing unit 1202 is specifically configured to: based on the configuration information of the second network device or the configuration information of the cell corresponding to the second network device, reselect to the cell corresponding to the second network device or initiate a reestablishment process to the cell corresponding to the second network device.

Optionally, when performing the second handling process, the processing unit 1202 is specifically configured to: receive a handover command from a second network device; and perform handover, according to the handover command, from a cell corresponding to the first network device to a cell corresponding to the second network device.

Optionally, the communication unit 1201 is further configured to send first indication information to the second network device. The first indication information indicates that the second fault occurs, and the first indication information includes one or more of the following information: a cause for the fault, a type of the fault, a measurement result of the radio signal, or a measurement report of the radio signal.

Optionally, the first fault is a radio link failure RLF, and the second fault is a fault of the first network device.

In another example, the apparatus 1200 may implement the steps performed by the first network device in the procedure shown in FIG. 3. The apparatus 1200 may be a network device, or a chip or a circuit configured in the network device. The communication unit 1201 is configured to perform a sending/receiving-related operation on the first network device side in the foregoing method embodiments. The processing unit 1202 is configured to perform a handling-related operation on the first network device side in the foregoing method embodiments.

For example, the processing unit 1202 is configured to obtain configuration information of a second network device or configuration information of a cell corresponding to the second network device. The communication unit 1201 is configured to send the configuration information of the second network device or the configuration information of the cell corresponding to the second network device to a terminal device. The processing unit 1202 is further configured to obtain a context of the terminal device and/or configuration information of the terminal device. The communication unit 1201 is further configured to send the context of the terminal device and/or the configuration information of the terminal device to the second network device.

Optionally, the configuration information of the second network device or the configuration information of the cell corresponding to the second network device includes one or more of the following information: identification information of the second network device, identification information of the cell corresponding to the second network device, frequency information of the cell corresponding to the second network device, or priority information of the cell corresponding to the second network device.

Optionally, when sending the context of the terminal device and/or the configuration information of the terminal device to the second network device, the communication unit 1201 is specifically configured to: directly send the context of the terminal device and/or the configuration information of the terminal device to the second network device; or send handover indication information to the second network device, where the handover indication information includes the context of the terminal device and/or the configuration information of the terminal device.

Optionally, the context of the terminal device includes security information, and/or the configuration information of the terminal device includes security information. The security information is used for security verification when the terminal device accesses the cell corresponding to the second network device.

In another example, the apparatus 1200 may implement the steps on a second network device side in the foregoing method embodiments. The apparatus 1200 may be a network device, or a chip or a circuit configured in the network device. The communication unit 1201 is configured to perform a sending/receiving-related operation on the second network device side in the foregoing method embodiments. The processing unit 1202 is configured to perform a handling-related operation on the second network device side in the foregoing method embodiments.

For example, the communication unit 1201 is configured to receive a context of a terminal device and/or configuration information of the terminal device from a first network device. The processing unit 1202 is configured to control, based on the context of the terminal device and/or the configuration information of the terminal device, the communication unit 1201 to communicate with the terminal device.

Optionally, when receiving the context of the terminal device and/or the configuration information of the terminal device from the first network device, the communication unit 1201 is specifically configured to: directly receive the context of the terminal device and/or the configuration information of the terminal device from the first network device; or receive handover indication information from the first network device, where the handover indication information includes the context of the terminal device and/or the configuration information of the terminal device.

Optionally, the context of the terminal device includes security information, and/or the configuration information of the terminal device includes security information. The security information is used for security verification when the terminal device accesses a cell corresponding to the second network device.

In another example, the apparatus 1200 may implement the steps on the second network device side in the foregoing method embodiments. The apparatus 1200 may be a network device, or a chip or a circuit configured in the network device. The communication unit 1201 is configured to perform a sending/receiving-related operation on the second network device side in the foregoing method embodiments. The processing unit 1202 is configured to perform a handling-related operation on the second network device side in the foregoing method embodiments.

For example, the communication unit 1201 is configured to send a handover command to a terminal device, where the handover command indicates the terminal device to be handed over from a cell corresponding to a first network device to a cell corresponding to the second network device. The processing unit 1202 is configured to control the communication unit 1201 to communicate with the terminal device.

Optionally, the communication unit 1201 is further configured to receive first indication information from the terminal device. The first indication information indicates that a second fault occurs, and the first indication information includes one or more of the following information: a cause for the fault, a type of the fault, a measurement result of a radio signal, or a measurement report of the radio signal.

Optionally, the communication unit 1201 is further configured to receive a context of the terminal device and/or configuration information of the terminal device from the first network device.

Optionally, when receiving the context of the terminal device and/or the configuration information of the terminal device from the first network device, the communication unit 1201 is specifically configured to: directly receive the context of the terminal device or the configuration information of the terminal device from the first network device; or receive handover indication information from the first network device, where the handover indication information includes the context of the terminal device and/or the configuration information of the terminal device.

In an example, the apparatus 1200 may implement the steps on the second network device side in the procedure shown in FIG. 9 in the foregoing embodiments. The apparatus 1200 may be a network device, or a chip or a circuit configured in the network device. The communication unit 1201 is configured to perform a sending/receiving-related operation on the second network device side in the foregoing method embodiments. The processing unit 1202 is configured to perform a handling-related operation on the second network device side in the foregoing method embodiments.

For example, the processing unit 1202 is configured to: when a second network device detects no first indication information sent by a first network device, determine that a fault occurs on the first network device, where the first indication information indicates that the first network device is in a normal working state. The communication unit 1201 is configured to send second indication information to a terminal device, where the second indication information indicates that a fault occurs on the first network device, or the second indication information indicates the terminal device to be handed over from the first network device to the second network device for communication.

In an example, the apparatus 1200 may implement the steps on the terminal device side in the procedure shown in FIG. 9 in the foregoing embodiments. The apparatus 1200 may be a terminal device, or a chip or a circuit configured in the terminal device. The communication unit 1201 is configured to perform a sending/receiving-related operation on the terminal device side in the foregoing method embodiments. The processing unit 1202 is configured to perform a handling-related operation on the terminal device side in the foregoing method embodiments.

For example, the communication unit 1201 is configured to receive second indication information from a second network device, where the second indication information indicates that a fault occurs on a first network device, or the second indication information indicates the terminal device to be handed over from the first network device to the second network device for communication. The processing unit 1202 is configured to be handed over, based on the second indication information, from the first network device to the second network device for communication.

In an example, the apparatus 1200 may implement the steps on the first network device side in the foregoing method embodiments. The apparatus 1200 may be a network device, or a chip or a circuit configured in the network device. The communication unit 1201 is configured to perform a sending/receiving-related operation on the first network device side in the foregoing method embodiments. The processing unit 1202 is configured to perform a handling-related operation of the first network device in the foregoing method embodiments.

For example, the processing unit 1202 is configured to determine first indication information, where the first indication information is used to determine that the first network device is in a normal working state. The communication unit 1201 is configured to send the first indication information to a second network device.

In an example, the apparatus 1200 may implement the steps on the first network device side in the procedure shown in FIG. 11 in the foregoing embodiments. The apparatus 1200 may be a network device, or a chip or a circuit configured in the network device. The communication unit 1201 is configured to perform a sending/receiving-related operation on the first network device side in the foregoing method embodiments. The processing unit 1202 is configured to perform a handling-related operation on the first network device side in the foregoing method embodiments.

For example, the processing unit 1202 is configured to determine a radio signal. The communication unit 1201 is configured to send the radio signal to a second network device.

In an example, the apparatus 1200 may implement the steps of the second network device in the procedure shown in FIG. 11 in the foregoing embodiments. The apparatus 1200 may be a network device, or a chip or a circuit configured in the network device. The communication unit 1201 is configured to perform a sending/receiving-related operation on the second network device side in the foregoing method embodiments. The processing unit 1202 is configured to perform a handling-related operation on the second network device side in the foregoing method embodiments.

For example, the communication unit 1201 is configured to receive a radio signal from a first network device. The processing unit 1202 is configured to determine, based on quality of the radio signal, that a fault occurs on the first network device. The communication unit 1201 is further configured to send first indication information to a terminal device, where the first indication information indicates that the fault occurs on the first network device, or the first indication information indicates the terminal device to be handed over from the first network device to the second network device for communication.

Optionally, when determining, based on the quality of the radio signal, that the fault occurs on the first network device, the processing unit 1202 is specifically configured to: when the quality of the radio signal is less than or equal to a first threshold, determine that the fault occurs on the first network device.

In an example, the apparatus 1200 may implement the steps of the terminal device in the procedure shown in FIG. 11 in the foregoing embodiments. The apparatus 1200 may be a terminal device, or a chip or a circuit configured in the terminal device. The communication unit 1201 is configured to perform a sending/receiving-related operation on the terminal device side in the foregoing method embodiments. The processing unit 1202 is configured to perform a handling-related operation on the terminal device side in the foregoing method embodiments.

For example, the communication unit 1201 is configured to receive first indication information from a second network device, where the first indication information indicates that a fault occurs on a first network device, or the first indication information indicates the terminal device to be handed over from the first network device to the second network device for communication. The processing unit 1202 is configured to be handed over, based on the first indication information, from the first network device to the second network device for communication.

In embodiments of this application, division into the units is an example, is merely division into logical functions, and may be other division during actual implementation. In addition, functional units in embodiments of this application may be integrated into one processor, or each of the units may exist alone physically, or two or more units may be integrated into one unit. The integrated unit may be implemented in a form of hardware, or may be implemented in a form of a software functional unit.

It can be understood that in the foregoing embodiments, functions of the communication unit can be implemented by a transceiver, and functions of the processing unit can be implemented by a processor. The transceiver may include a transmitter and/or a receiver, respectively configured to implement functions of the sending unit and/or the receiving unit. Descriptions are provided below by way of example with reference to FIG. 11.

Figure 13:
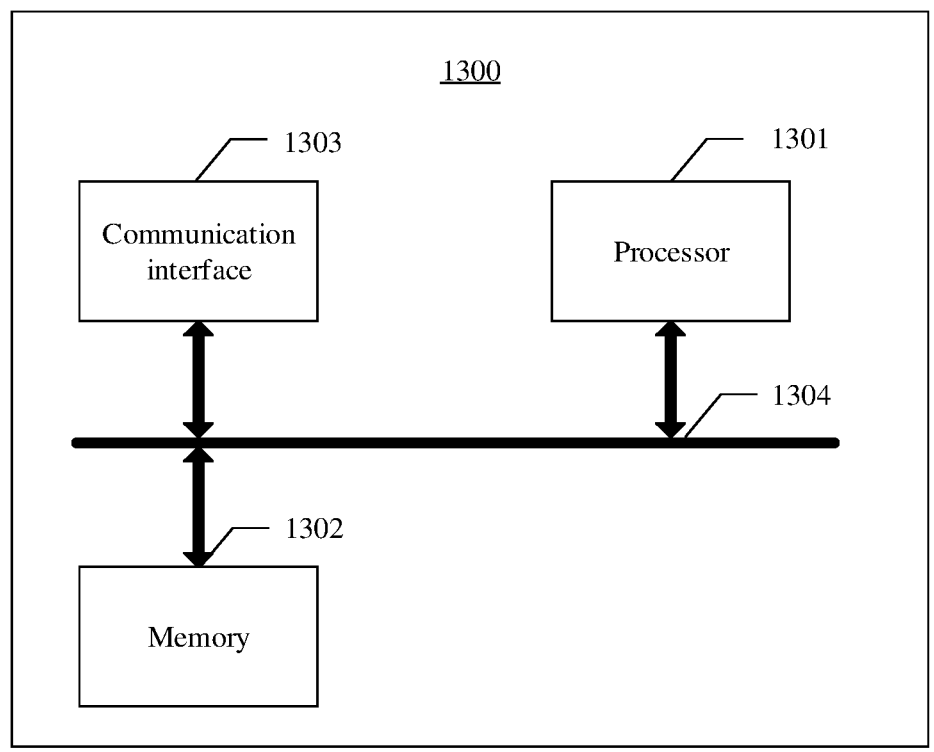
FIG. 13 is another schematic diagram of a structure of an apparatus according to an embodiment of this application.

FIG. 13 is a schematic block diagram of an apparatus 1300 according to an embodiment of this application. The apparatus 1300 shown in FIG. 13 may be an implementation of a hardware circuit of the apparatus shown in FIG. 12. The apparatus is applicable to the procedures shown in FIG. 1 to FIG. 11, and performs functions of the network device or the terminal device in the foregoing method embodiments. For ease of description, FIG. 13 shows only main components of the communication apparatus.

The apparatus 1300 shown in FIG. 13 includes at least one processor 1301. The apparatus 1300 may further include at least one memory 1302, configured to store program instructions and/or data. The memory 1302 is coupled to the processor 1301. The coupling in this embodiment of this application is an indirect coupling or a communication connection between apparatuses, units, or modules, may be in an electrical form, a mechanical form, or another form, and is used for information exchange between the apparatuses, the units, or the modules. The processor 1301 may perform an operation cooperatively with the memory 1302. The processor 1301 may execute the program instructions stored in the memory 1302. At least one of the at least one memory 1302 may be included in the processor 1301.

The apparatus 1300 may further include a communication interface 1303, configured to communicate with another device through a transmission medium, so that the apparatus 1300 may communicate with the another device. In this embodiment of this application, the communication interface may be a transceiver, a circuit, a bus, a module, or another type of communication interface. In this embodiment of this application, when the communication interface is a transceiver, the transceiver may include an independent receiver and an independent transmitter, or may be a transceiver integrated with a transceiver function, an interface circuit, or the like.

It should be understood that connection media between the processor 1301, the memory 1302, and the communication interface 1303 are not limited in this embodiment of this application. In this embodiment of this application, in FIG. 13, the memory 1302, the processor 1301, and the communication interface 1303 are connected through a communication bus 1304. The bus is represented by using a thick line in FIG. 13. A connection manner between other components is merely an example for description, and is not limited. The bus may include an address bus, a data bus, a control bus, and the like. For ease of representation, only one thick line is used to represent the bus in FIG. 13, but this does not mean that there is only one bus, only one type of bus, or the like.

In an example, the apparatus 1300 is configured to implement the steps performed by the terminal device in the procedure shown in FIG. 3. The communication interface 1303 is configured to perform a sending/receiving-related operation on the terminal device side in the foregoing method embodiments. The processor 1301 is configured to perform a handling-related operation of the terminal device in the foregoing method embodiments.

For example, the communication interface 1303 is configured to receive a radio signal from a first network device. The processor 1301 is configured to: measure the radio signal, determine a measurement result, determine a first threshold and a second threshold, determine a first comparison result based on the measurement result and at least one of the first threshold or the second threshold, and determine a first handling manner based on the first comparison result. A value of the first threshold is greater than a value of the second threshold.

Optionally, when determining the first handling manner based on the first comparison result, the processor 1301 is specifically configured to:

The first comparison result is that the measurement result is greater than or equal to the first threshold, and the first handling manner is to determine that wireless communication between the terminal device and the first network device is normal; the first comparison result is that the measurement result is less than the first threshold and greater than or equal to the second threshold, and the first handling manner is to determine that a first fault occurs, and perform a first handling process; or the first comparison result is that the measurement result is less than the second threshold, and the first handling manner is to determine that a second fault occurs, and perform a second handling process.

Optionally, that the first comparison result is that the measurement result is less than the second threshold includes: Within running duration of a first timer, measurement results of the radio signal of the first network device are all less than the second threshold; or results of measuring the radio signal of the first network device for N consecutive times are all less than the second threshold, where N is a positive integer greater than 0.

Optionally, the communication interface 1303 is further configured to receive configuration information of a second network device or configuration information of a cell corresponding to the second network device from the first network device. The configuration information of the second network device or the configuration information of the cell corresponding to the second network device includes one or more of the following information: identification information of the second network device, identification information of the cell corresponding to the second network device, frequency information of the cell corresponding to the second network device, or priority information of the cell corresponding to the second network device.

Optionally, when performing the second handling process, the processor 1301 is specifically configured to: based on the configuration information of the second network device or the configuration information of the cell corresponding to the second network device, reselect to the cell corresponding to the second network device or initiate a reestablishment process to the cell corresponding to the second network device.

Optionally, when performing the second handling process, the processor 1301 is specifically configured to: receive a handover command from a second network device; and hand over, according to the handover command, from a cell corresponding to the first network device to a cell corresponding to the second network device.

Optionally, the communication interface 1303 is further configured to send first indication information to the second network device. The first indication information indicates that the second fault occurs, and the first indication information includes one or more of the following information: a cause for the fault, a type of the fault, a measurement result of the radio signal, or a measurement report of the radio signal.

Optionally, the first fault is a radio link failure RLF, and the second fault is a fault of the first network device.

In an example, the apparatus 1300 is configured to implement the steps performed by the first network device in the procedure shown in FIG. 3. The apparatus 1300 may be a network device, or a chip or a circuit configured in the network device. The communication interface 1303 is configured to perform a sending/receiving-related operation on a first network device side in the foregoing method embodiments. The processor 1301 is configured to perform a handling-related operation on the first network device side in the foregoing method embodiments.

For example, the processor 1301 is configured to determine configuration information of a second network device or configuration information of a cell corresponding to the second network device. The communication interface 1303 is configured to send the configuration information of the second network device or the configuration information of the cell corresponding to the second network device to a terminal device. The processor 1301 is further configured to determine a context of the terminal device and/or configuration information of the terminal device. The communication interface 1303 is further configured to send the context of the terminal device and/or the configuration information of the terminal device to the second network device.

Optionally, the configuration information of the second network device or the configuration information of the cell corresponding to the second network device includes one or more of the following information: identification information of the second network device, identification information of the cell corresponding to the second network device, frequency information of the cell corresponding to the second network device, or priority information of the cell corresponding to the second network device.

Optionally, when sending the context of the terminal device and/or the configuration information of the terminal device to the second network device, the communication interface 1303 is specifically configured to: directly send the context of the terminal device and/or the configuration information of the terminal device to the second network device; or send handover indication information to the second network device, where the handover indication information includes the context of the terminal device and/or the configuration information of the terminal device.

Optionally, the context of the terminal device includes security information, and/or the configuration information of the terminal device includes security information. The security information is used for security verification when the terminal device accesses the cell corresponding to the second network device.

In an example, the apparatus 1300 is configured to implement the steps performed by the second network device in the foregoing method embodiments. The apparatus 1300 may be a network device, or a chip or a circuit configured in the network device. The communication interface 1303 is configured to perform a sending/receiving-related operation on a second network device side in the foregoing method embodiments. The processor 1301 is configured to perform a handling-related operation on the second network device side in the foregoing method embodiments.

For example, the communication interface 1303 is configured to receive a context of a terminal device and/or configuration information of the terminal device from a first network device. The processor 1301 is configured to communicate with the terminal device based on the context of the terminal device and/or the configuration information of the terminal device.

Optionally, when receiving the context of the terminal device and/or the configuration information of the terminal device from the first network device, the communication interface 1303 is specifically configured to: directly receive the context of the terminal device and/or the configuration information of the terminal device from the first network device; or receive handover indication information from the first network device, where the handover indication information includes the context of the terminal device and/or the configuration information of the terminal device.

Optionally, the context of the terminal device includes security information, and/or the configuration information of the terminal device includes security information. The security information is used for security verification when the terminal device accesses a cell of the second network device.

In an example, the apparatus 1300 is configured to implement the steps performed by the second network device in the foregoing method embodiments. The apparatus 1300 may be a network device, or a chip or a circuit configured in the network device. The communication interface 1303 is configured to perform a sending/receiving-related operation on a second network device side in the foregoing method embodiments. The processor 1301 is configured to perform a handling-related operation on the second network device side in the foregoing method embodiments.

For example, the communication interface 1303 is configured to send a handover command to a terminal device, where the handover command indicates the terminal device to be handed over from a cell corresponding to a first network device to a cell corresponding to the second network device. The processor 1301 is configured to control the communication interface 1303 to communicate with the terminal device.

Optionally, the communication interface 1303 is further configured to receive first indication information from the terminal device. The first indication information indicates that a second fault occurs, and the first indication information includes one or more of the following information: a cause for the fault, a type of the fault, a measurement result of a radio signal, or a measurement report of the radio signal.

Optionally, the communication interface 1303 is further configured to receive a context of the terminal device and/or configuration information of the terminal device from the first network device.

Optionally, when receiving the context of the terminal device and/or the configuration information of the terminal device from the first network device, the communication interface 1303 is specifically configured to: directly receive the context of the terminal device or the configuration information of the terminal device from the first network device; or receive handover indication information from the first network device, where the handover indication information includes the context of the terminal device and/or the configuration information of the terminal device.

In an example, the apparatus 1300 is configured to implement the steps of the second network device in the procedure shown in FIG. 9 in the foregoing method embodiments. The apparatus 1300 may be a network device, or a chip or a circuit configured in the network device. The communication interface 1303 is configured to perform a sending/receiving-related operation on a second network device side in the foregoing method embodiments. The processor 1301 is configured to perform a handling-related operation on the second network device side in the foregoing method embodiments.

For example, the processor 1301 is configured to: when no first indication information sent by a first network device is detected, determine that a fault occurs on the first network device, where the first indication information indicates that the first network device is in a normal working state. The communication interface 1303 is configured to send second indication information to a terminal device, where the second indication information indicates that a fault occurs on the first network device, or the second indication information indicates the terminal device to be handed over from the first network device to the second network device.

In an example, the apparatus 1300 is configured to implement the steps of the terminal device in the procedure shown in FIG. 9 in the foregoing method embodiments. The apparatus 1300 may be a terminal device, or a chip or a circuit configured in the terminal device. The communication interface 1303 is configured to perform a sending/receiving-related operation on the terminal device side in the foregoing method embodiments. The processor 1301 is configured to perform a handling-related operation on the terminal device side in the foregoing method embodiments.

For example, the communication interface 1303 is configured to receive second indication information from a second network device, where the second indication information indicates that a fault occurs on a first network device, or the second indication information indicates the terminal device to be handed over from the first network device to the second network device for communication. The processor 1301 is configured to be handed over, based on the second indication information, from the first network device to the second network device for communication.

In an example, the apparatus 1300 is configured to implement the steps on the first network device side in the foregoing method embodiments. The apparatus 1300 may be a network device, or a chip or a circuit configured in the network device. The communication interface 1303 is configured to perform a sending/receiving-related operation on the first network device side in the foregoing method embodiments. The processor 1301 is configured to perform a handling-related operation on the first network device side in the foregoing method embodiments.

For example, the processor 1301 is configured to determine first indication information, where the first indication information is used to determine that a first network device is in a normal working state. The communication interface 1303 is configured to send the first indication information to a second network device.

In an example, the apparatus 1300 is configured to implement the steps of the first network device in the procedure shown in FIG. 11 in the foregoing method embodiments. The apparatus 1300 may be a first network device, or a chip or a circuit configured in the first network device. The communication interface 1303 is configured to perform a sending/receiving-related operation on a first network device side in the foregoing method embodiments. The processor 1301 is configured to perform a handling-related operation on the first network device side in the foregoing method embodiments.

For example, the processor 1301 is configured to determine a radio signal. The communication interface 1303 is configured to send the radio signal to a second network device.

In an example, the apparatus 1300 is configured to implement the steps of the second network device in the procedure shown in FIG. 11 in the foregoing method embodiments. The apparatus 1300 may be a second network device, or a chip or a circuit configured in the second network device. The communication interface 1303 is configured to perform a sending/receiving-related operation on a second network device side in the foregoing method embodiments. The processor 1301 is configured to perform a handling-related operation on the second network device side in the foregoing method embodiments.

For example, the communication interface 1303 is configured to receive a radio signal from a first network device. The processor 1301 is configured to determine, based on quality of the radio signal, that a fault occurs on the first network device. The communication interface 1303 is further configured to send first indication information to a terminal device, where the first indication information indicates that a fault occurs on the first network device, or the first indication information indicates the terminal device to be handed over from the first network device to the second network device for communication.

Optionally, when determining, based on the quality of the radio signal, that a fault occurs on the first network device, the processor 1301 is specifically configured to: when the quality of the radio signal is less than or equal to a first threshold, determine that a fault occurs on the first network device.

In an example, the apparatus 1300 is configured to implement the steps of the terminal device in the procedure shown in FIG. 11 in the foregoing method embodiments. The apparatus 1300 may be a terminal device, or a chip or a circuit configured in the terminal device. The communication interface 1303 is configured to perform a sending/receiving-related operation on the terminal device side in the foregoing method embodiments. The processor 1301 is configured to perform a handling-related operation on the terminal device side in the foregoing method embodiments.

For example, the communication interface 1303 is configured to receive first indication information from a second network device, where the first indication information indicates that a fault occurs on a first network device, or the first indication information indicates the terminal device to be handed over from the first network device to the second network device for communication. The processor 1301 is configured to be handed over, based on the first indication information, from the first network device to the second network device for communication.

Further, this application further provides an apparatus, including units configured to perform each step in the procedure shown in FIG. 3, FIG. 9, or FIG. 11 in the foregoing embodiments. Alternatively, the apparatus includes at least one processor and an interface circuit. The at least one processor is configured to communicate with another apparatus by using the interface circuit, and perform the method in the procedure shown in FIG. 3, FIG. 9, or FIG. 11. Alternatively, the apparatus includes a processor, configured to invoke a program stored in a memory, to perform the method in the procedure in FIG. 3, FIG. 9, or FIG. 11.

This application further provides a computer-readable storage medium, including a program. When the program is run by a processor, the method in the procedure in FIG. 3, FIG. 9, or FIG. 11 is performed. This application further provides a chip system. The chip system includes a processor, and may further include a memory, configured to implement the method in the procedure shown in FIG. 3, FIG. 9, or FIG. 11. The chip system may include a chip, or may include a chip and another discrete device. This application further provides a computer program product, including instructions. When the computer program product runs on a computer, the computer is enabled to perform the method shown in FIG. 3, FIG. 9, or FIG. 11. This application further provides a system, including the terminal device, the first network device, and/or the second network device in the foregoing embodiments.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, any conventional processor, or the like. The steps of the methods disclosed with reference to embodiments of this application may be directly performed and completed by a hardware processor, or may be performed and completed by using a combination of hardware in the processor and a software module.

In embodiments of this application, the memory may be a non-volatile memory, such as a hard disk drive (hard disk drive, HDD) or a solid-state drive (solid-state drive, SSD), or may be a volatile memory (volatile memory), such as a random access memory (random-access memory, RAM). The memory is any other medium that can carry or store expected program code in a form of an instruction structure or a data structure and that can be accessed by a computer, but is not limited thereto. The memory in embodiments of this application may alternatively be a circuit or any other apparatus that can implement a storage function, and is configured to store program instructions and/or data.

All or some of the methods in embodiments of this application may be implemented through software, hardware, firmware, or any combination thereof. When software is used to implement embodiments, all or some of embodiments may be implemented in a form of a computer program product. The computer program product includes one or more computer instructions. When the computer program instructions are loaded and executed on a computer, all or some of procedures or functions according to embodiments of the present invention are generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD for short)), a semiconductor medium (for example, an SSD), or the like.

It is clear that a person skilled in the art can make various modifications and variations to this application without departing from the scope of this application. This application is intended to cover the modifications and variations of this application provided that they fall within the scope of the following claims and equivalent technologies of this application.

What is claimed is:

1. A communication method, comprising:
receiving, by a terminal device from a first network device while the terminal device is connected to the first network device, configuration information of a second network device or configuration information of a cell corresponding to the second network device, wherein the configuration information of the second network device or the configuration information of the cell corresponding to the second network device comprises: identification information of the second network device, identification information of the cell corresponding to the second network device, frequency information of the cell corresponding to the second network device, or priority information of the cell corresponding to the second network device;

receiving, by the terminal device, a radio signal from the first network device;

measuring, by the terminal device, the radio signal, and determining a measurement result from the radio signal;

determining, by the terminal device, a first threshold and a second threshold, wherein the first threshold is greater than the second threshold;

determining, by the terminal device, a first comparison result based on the measurement result and a plurality of thresholds comprising at least the first threshold, the second threshold, and at least one additional threshold, the at least one additional threshold representing at least one value between the first threshold and the second threshold, wherein each different value relationship in the plurality of thresholds defines a different scenario;

determining, by the terminal device, a first handling manner for the terminal device based on the first comparison result, wherein each different scenario defined based on the plurality of thresholds corresponds to a different handling manner, and determining the first handling manner for the terminal device comprises:
in response to determining that the measurement result is greater than or equal to the first threshold, determining the first handling manner comprises determining that wireless communication between the terminal device and the first network device is normal;
in response to determining that the measurement result is less than the first threshold and greater than or equal to the second threshold, determining the first handling manner comprises determining that a first fault occurs and performing a first handling process, wherein the first fault is a radio link failure (RLF), and performing the first handling process comprising starting a first timer, and executing a radio resource control (RRC) reestablishment process when the first timer expires; and
in response to determining that the measurement result is less than the second threshold, determining the first handling manner comprises determining that a second fault occurs and performing a second handling process, wherein the second fault is a fault of the first network device, and the second handling process comprises receiving, by the terminal device, a handover command from a second network device, and handing over, by the terminal device according to the handover command, from a cell corresponding to the first network device to a cell corresponding to the second network device.

2. The method according to claim 1, wherein the method second handling process further comprises:
after determining that the second fault occurs and before receiving the handover command, sending, by the terminal device, first indication information to the second network device, wherein the first indication information indicates that the second fault occurs, and the first indication information comprises any one or more portions of information comprising: a cause for the fault, a type of the fault, the measurement result of the radio signal, and a measurement report of the radio signal.

3. The method according to claim 1, wherein the radio signal is a reference signal or a measurement signal.

4. The method according to claim 1, wherein the first threshold and the second threshold are protocol-stipulated.

5. The method according to claim 1, wherein the first threshold and the second threshold are configured by the first network device for the terminal device.

6. The method according to claim 1, wherein the first threshold is configured by the first network device for the terminal device, and the second threshold is protocol-stipulated.

7. The method according to claim 1, wherein the terminal device and the second network device are in a non-connected mode when it is determined that the second fault occurs.

8. A communication method, comprising:
receiving, by a second network device, a context of a terminal device or configuration information of the terminal device from a first network device while the second network device is not connected to the terminal device;
after receiving the context of the terminal device or the configuration information of the terminal device from the first network device, receiving, by the second network device, first indication information from the terminal device, wherein the first indication information indicates that a second fault occurs, the second fault is a fault of the first network device, and the first indication information comprises: a cause for the second fault or a type of the second fault;
in response to receiving the first indication information, sending, by the second network device, a handover command to the terminal device, wherein the handover command indicates to the terminal device to hand over from a cell corresponding to the first network device to a cell corresponding to the second network device, wherein the handover command is in response to the second fault being determined based on a comparison result of a measurement result of a radio signal of the first network device with at least one threshold of a plurality of thresholds, the plurality of thresholds comprising at least a first threshold, a second threshold, and at least one additional threshold representing at least one value between the first threshold and the second threshold, wherein each different value relationship in the plurality of thresholds defines a different scenario, and wherein the first threshold is greater than the second threshold, and the second fault is determined based on the measurement result being less than the second threshold; and
communicating, by the second network device, with the terminal device.

9. The method according to claim 8, wherein receiving, by the second network device, the context of the terminal device or the configuration information of the terminal device from the first network device comprises:

directly receiving, by the second network device, the context of the terminal device or the configuration information of the terminal device from the first network device.

10. The method according to claim 8, wherein the second network device receives the context of the terminal device or the configuration information of the terminal device from the first network device when the terminal device establishes a radio resource control connection in a cell of the first network device.

11. The method according to claim 8, wherein the context of the terminal device or the configuration information of the terminal device further comprises verification information of the terminal device.

12. The method according to claim 8, wherein receiving, by the second network device, the context of the terminal device or the configuration information of the terminal device from the first network device comprises:
receiving, by the second network device, the context of the terminal device and the configuration information of the terminal device from the first network device.

13. A communication device, comprising one or more processors, and a memory, wherein the memory stores a computer program, and when executing the computer program stored in the memory, the one or more processors execute operations comprising:
receiving, from a first network device while being connected to the first network device, configuration information of a second network device or configuration information of a cell corresponding to the second network device, wherein the configuration information of the second network device or the configuration information of the cell corresponding to the second network device comprises: identification information of the second network device, identification information of the cell corresponding to the second network device, frequency information of the cell corresponding to the second network device, or priority information of the cell corresponding to the second network device;
receiving a radio signal from the first network device; and measuring the radio signal;
determining a measurement result from the radio signal;
determining a first threshold and a second threshold;
determining a first comparison result based on the measurement result and a plurality of thresholds comprising at least the first threshold, the second threshold, and at least one additional threshold, the at least one additional threshold representing at least one value between the first threshold and the second threshold, wherein each different value relationship in the plurality of thresholds defines a different scenario;
determining a first handling manner based on the first comparison result, wherein the first threshold is greater than the second threshold, wherein each different scenario defined based on the plurality of thresholds corresponds to a different handling manner, and determining the first handling manner comprises:
in response to determining that the measurement result is greater than or equal to the first threshold, determining the first handling manner comprises determining that wireless communication between a terminal device and the first network device is normal;
in response to determining that the measurement result is less than the first threshold and greater than or equal to the second threshold, determining the first handling manner comprises determining that a first fault occurs and performing a first handling process, wherein the first fault is a radio link failure (RLF), and performing the first handling process comprises starting a first timer, and executing a radio resource control (RRC) reestablishment process when the first timer expires; and in response to determining that the measurement result is less than the second threshold, determining the first handling manner comprises determining that a second fault occurs and performing a second handling process, wherein the second fault is a fault of the first network device, and the second handling process comprises receiving, by the terminal device, a handover command from a second network device, and handing over, by the terminal device according to the handover command, from a cell corresponding to the first network device to a cell corresponding to the second network device.

14. The communication device according to claim 13, wherein the second handling process further comprises:

after determining the second fault, and before receiving the handover command, sending first indication information to the second network device, wherein the first indication information indicates that the second fault occurs, and the first indication information comprises one or more of the following information: a cause for the fault, a type of the fault, the measurement result of the radio signal, and a measurement report of the radio signal.

15. The communication device according to claim 13, wherein the radio signal is a reference signal or a measurement signal.

16. A communication device, comprising one or more processors, and a memory, wherein the memory stores a computer program, and when executing the computer program stored in the memory, the one or more processors execute operations comprising:

receiving a context of a terminal device or configuration information of the terminal device from a first network device while the communication device is not connected to the terminal device;

after receiving the context of the terminal device or the configuration information of the terminal device from the first network device, receiving first indication information from the terminal device, wherein the first indication information indicates that a second fault occurs, the second fault is a fault of the first network device, and the first indication information comprises:

a cause for the second fault, a type of the second fault, a measurement result of a radio signal of the first network device by the terminal device, or a measurement report of a radio signal of the first network device measured by the terminal device;

in response to receiving the first indication information, sending a handover command to the terminal device, wherein the handover command indicates to the terminal device to hand over from a cell corresponding to the first network device to a cell corresponding to a second network device, wherein the handover command is in response to a fault being determined based on a comparison result of the measurement result of the radio signal of the first network device with at least one threshold of a plurality of thresholds, the plurality of thresholds comprising at least a first threshold, a second threshold, and at least one additional threshold representing at least one value between the first threshold and the second threshold, wherein each different value relationship in the plurality of thresholds defines a different scenario, and wherein the first threshold is greater than the second threshold, and the second fault is determined based on the measurement result being less than the second threshold; and communicating with the terminal device.

17. The communication device according to claim 16, wherein receiving the context of the terminal device or the configuration information of the terminal device from the first network device, comprising:

directly receiving the context of the terminal device or the configuration information of the terminal device from the first network device.

18. The communication device according to claim 16, wherein receiving the context of the terminal device or the configuration information of the terminal device from the first network device comprises:

receiving the context of the terminal device or the configuration information of the terminal device from the first network device when the terminal device establishes a radio resource control connection in the cell of the first network device.

19. The communication device according to claim 16, wherein the context of the terminal device or the configuration information of the terminal device further comprises verification information of the terminal device.

20. The communication device according to claim 16, wherein receiving the context of the terminal device or the configuration information of the terminal device from the first network device comprises:

receiving the context of the terminal device and the configuration information of the terminal device from the first network device.

* * * * *